United States Patent
Gong et al.

(10) Patent No.: US 9,806,690 B1
(45) Date of Patent: Oct. 31, 2017

(54) SUBSYNCHRONOUS OSCILLATION RELAY

(71) Applicant: AEP Transmission Holding Company, LLC, Columbus, OH (US)

(72) Inventors: Yanfeng Gong, Dublin, OH (US); Yiyan Xue, Dublin, OH (US)

(73) Assignee: AEP Transmission Holding Company, LLC, Columbus, OH (US)

( * ) Notice: Subject to any disclaimer, the term of this patent is extended or adjusted under 35 U.S.C. 154(b) by 0 days.

(21) Appl. No.: 15/282,498

(22) Filed: Sep. 30, 2016

(51) Int. Cl.
    *H02H 7/06* (2006.01)
    *H03H 7/01* (2006.01)
    *F03D 9/25* (2016.01)

(52) U.S. Cl.
    CPC ........... *H03H 7/0138* (2013.01); *F03D 9/257* (2017.02); *H02H 7/06* (2013.01)

(58) Field of Classification Search
    CPC ........ H03H 7/0138; F03D 9/257; H02H 7/00; H02J 3/1842; H02J 3/24; H02J 3/386; H02J 3/48; H02P 9/007; H02P 9/105; H02S 10/12
    USPC .................. 702/65, 72; 361/21, 182, 184
    See application file for complete search history.

(56) References Cited

U.S. PATENT DOCUMENTS

| | | | | |
|---|---|---|---|---|
| 4,470,091 A * | 9/1984 | Sun | ..................... | H02H 3/46 340/658 |
| 6,972,972 B2 * | 12/2005 | Duncan | ................. | H02M 7/003 363/131 |
| 7,423,411 B2 * | 9/2008 | Sihler | ..................... | H02P 23/04 322/19 |
| 8,026,623 B2 * | 9/2011 | Wakasa | ................. | F03D 7/0224 290/44 |
| 8,058,753 B2 * | 11/2011 | Achilles | ................. | F03D 7/0284 307/153 |
| 8,174,150 B2 * | 5/2012 | Delmerico | ............. | H02J 3/386 307/151 |
| 8,558,405 B2 * | 10/2013 | Brogan | .................. | H02J 3/386 290/55 |
| 8,922,175 B2 * | 12/2014 | Krok | ..................... | H02J 3/1828 323/209 |
| 8,994,202 B2 * | 3/2015 | Gupta | .................... | F03D 9/003 290/44 |
| 9,000,611 B2 * | 4/2015 | Lorenz | .................... | H02H 7/06 307/153 |
| 9,000,734 B2 * | 4/2015 | Andresen | .................. | H02P 9/02 322/23 |
| 9,263,894 B2 * | 2/2016 | Robinett, III | ............. | H02J 3/38 |
| 9,455,633 B2 * | 9/2016 | Olea | ....................... | H02M 3/335 |
| 9,513,614 B2 * | 12/2016 | Schnetzka | ............. | G05B 15/02 |
| 9,608,431 B2 * | 3/2017 | Carter | .................... | H02H 3/093 |
| 2007/0159265 A1 * | 7/2007 | Weng | ................. | G01R 19/2513 331/17 |

(Continued)

OTHER PUBLICATIONS

Gross, L.G., Sub-synchronous Grid Conditions: New Event, New Problem, and New Solutions, 37th Annual Western Protective Relay Conference, Spokane, Washington, Oct. 2010.

(Continued)

*Primary Examiner* — Rita Leykin
(74) *Attorney, Agent, or Firm* — Standley Law Group LLP

(57) ABSTRACT

Relay devices and methods of use for detecting and reacting to subsynchronous oscillation events in electrical energy generation and transmission systems, such as but not limited to, subsynchronous control interactions between wind-turbine generators and series-compensated transmission lines.

31 Claims, 24 Drawing Sheets

(56) References Cited

U.S. PATENT DOCUMENTS

| | | | | |
|---|---|---|---|---|
| 2007/0177314 A1* | 8/2007 | Weng | ............... | H02P 9/007 |
| | | | | 361/20 |
| 2010/0109616 A1* | 5/2010 | Li | ............... | G05F 1/70 |
| | | | | 323/210 |
| 2013/0082636 A1* | 4/2013 | Ohori | ............... | H02P 4/00 |
| | | | | 318/723 |
| 2013/0175871 A1* | 7/2013 | Knuppel | ............... | H02J 3/24 |
| | | | | 307/102 |
| 2014/0246914 A1* | 9/2014 | Chopra | ............... | H02J 3/1807 |
| | | | | 307/84 |
| 2016/0245850 A1* | 8/2016 | Kasztenny | ............... | G01R 23/02 |

OTHER PUBLICATIONS

Schweitzer III, E.O. et al., Filtering for Protective Relays, 19th Annual Western Protective Relay Conference, Spokane, Washington, Oct. 1992.

Anderson, P.M. et al., Series Compensation of Power Systems, ISBN 1-888747-01-3, pp. 229-231.

\* cited by examiner

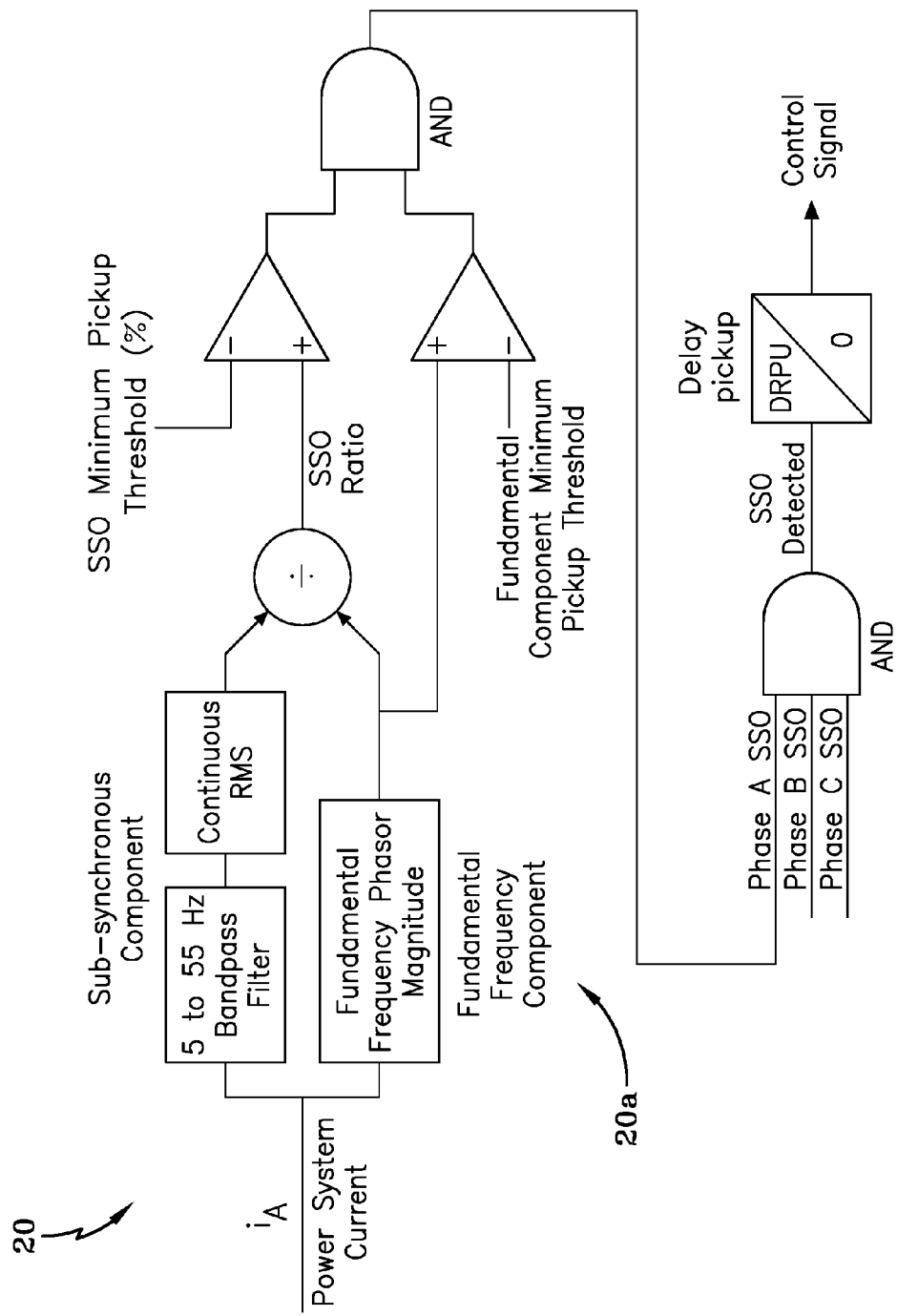
FIG.7A,(a)

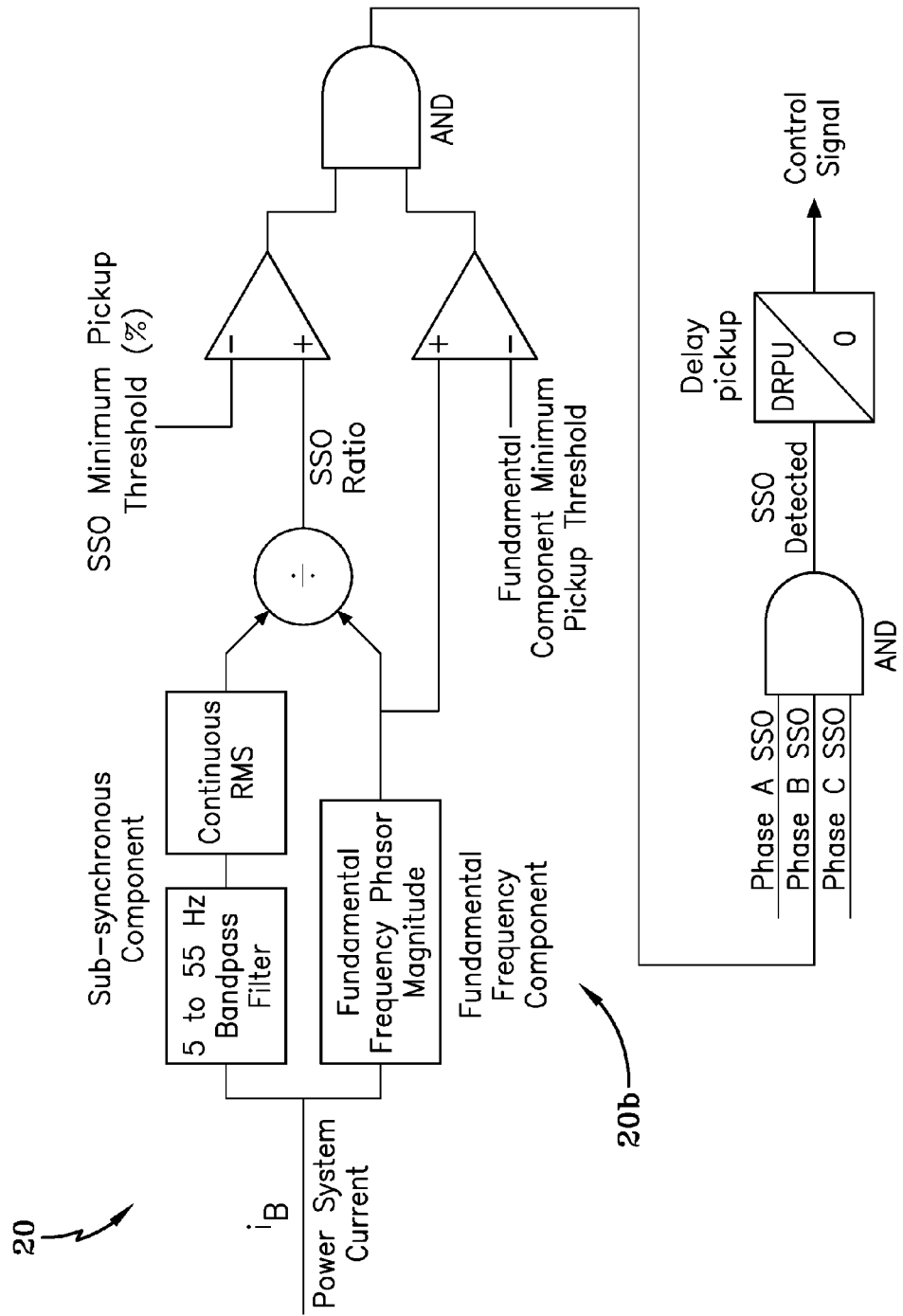
FIG.7A,(b)

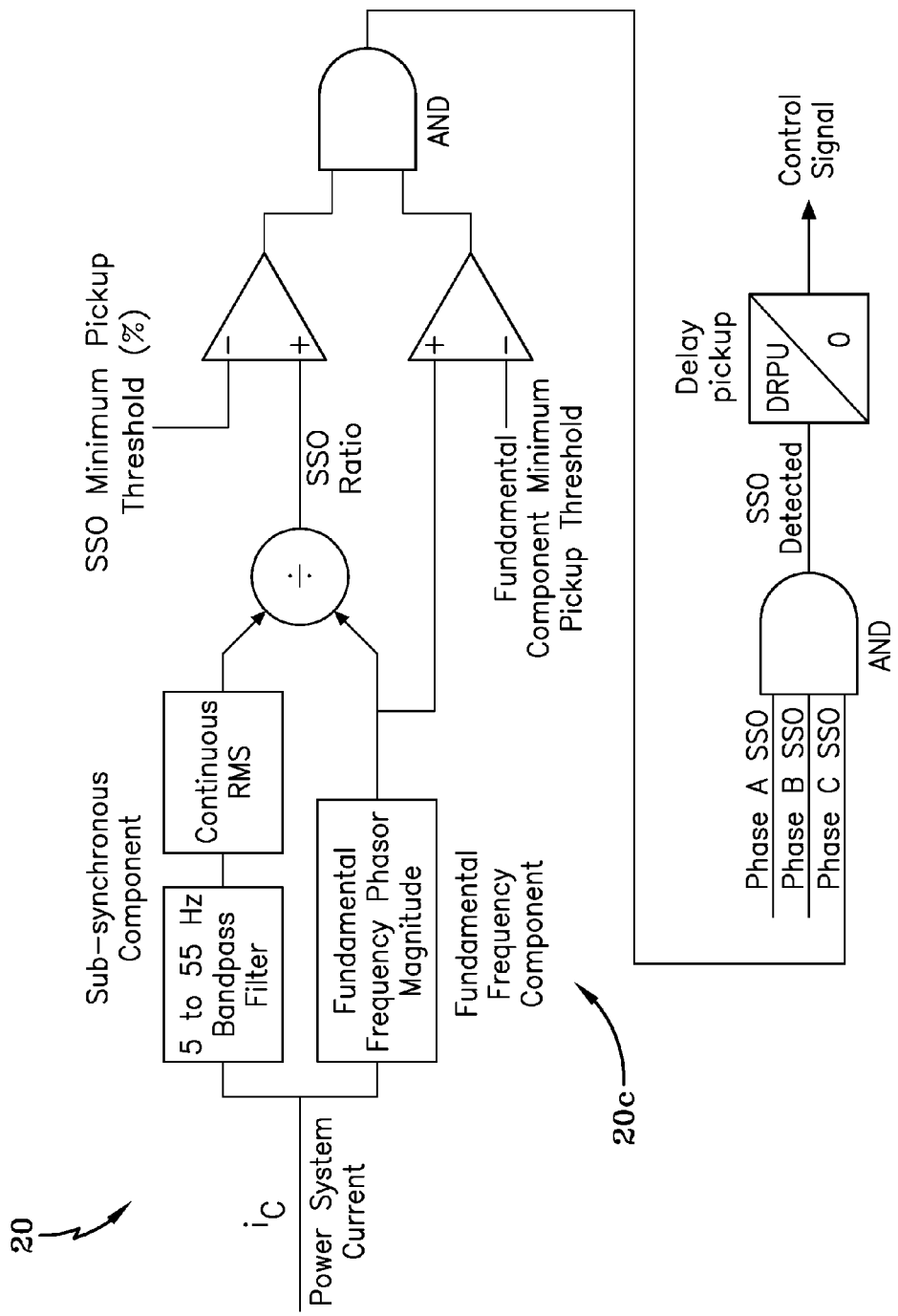
FIG.7A,(c)

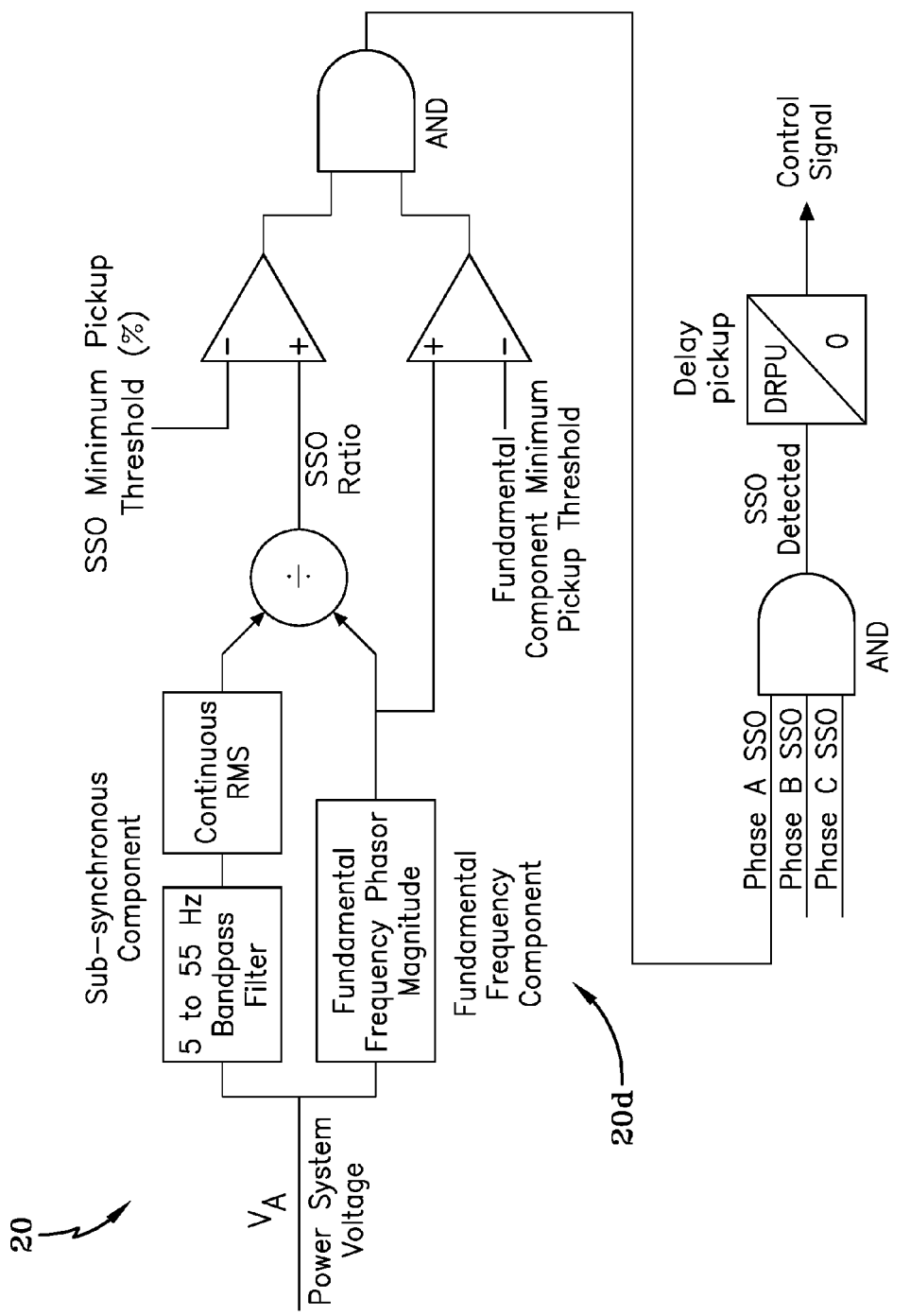
FIG. 7B, (a)

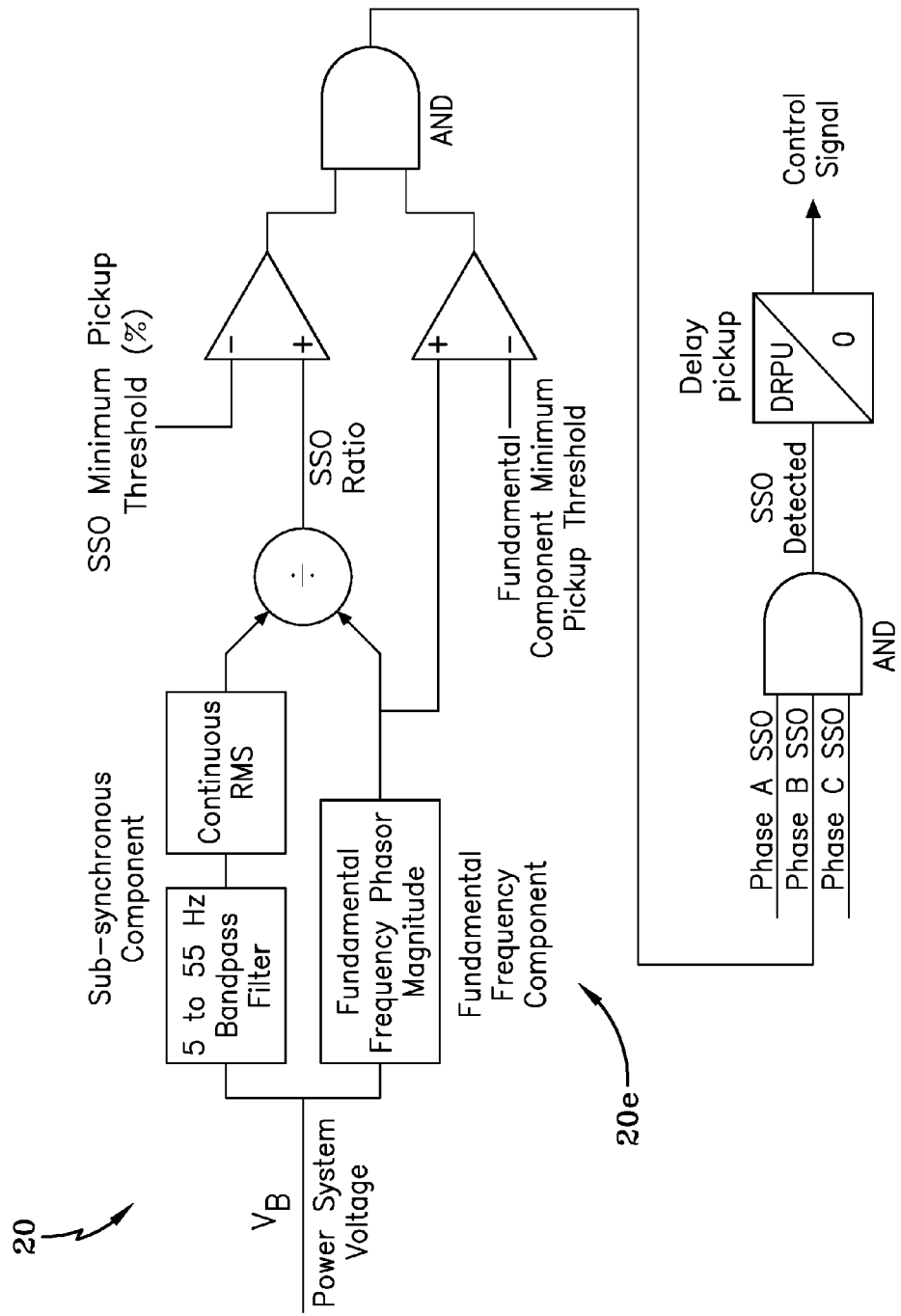
FIG. 7B,(b)

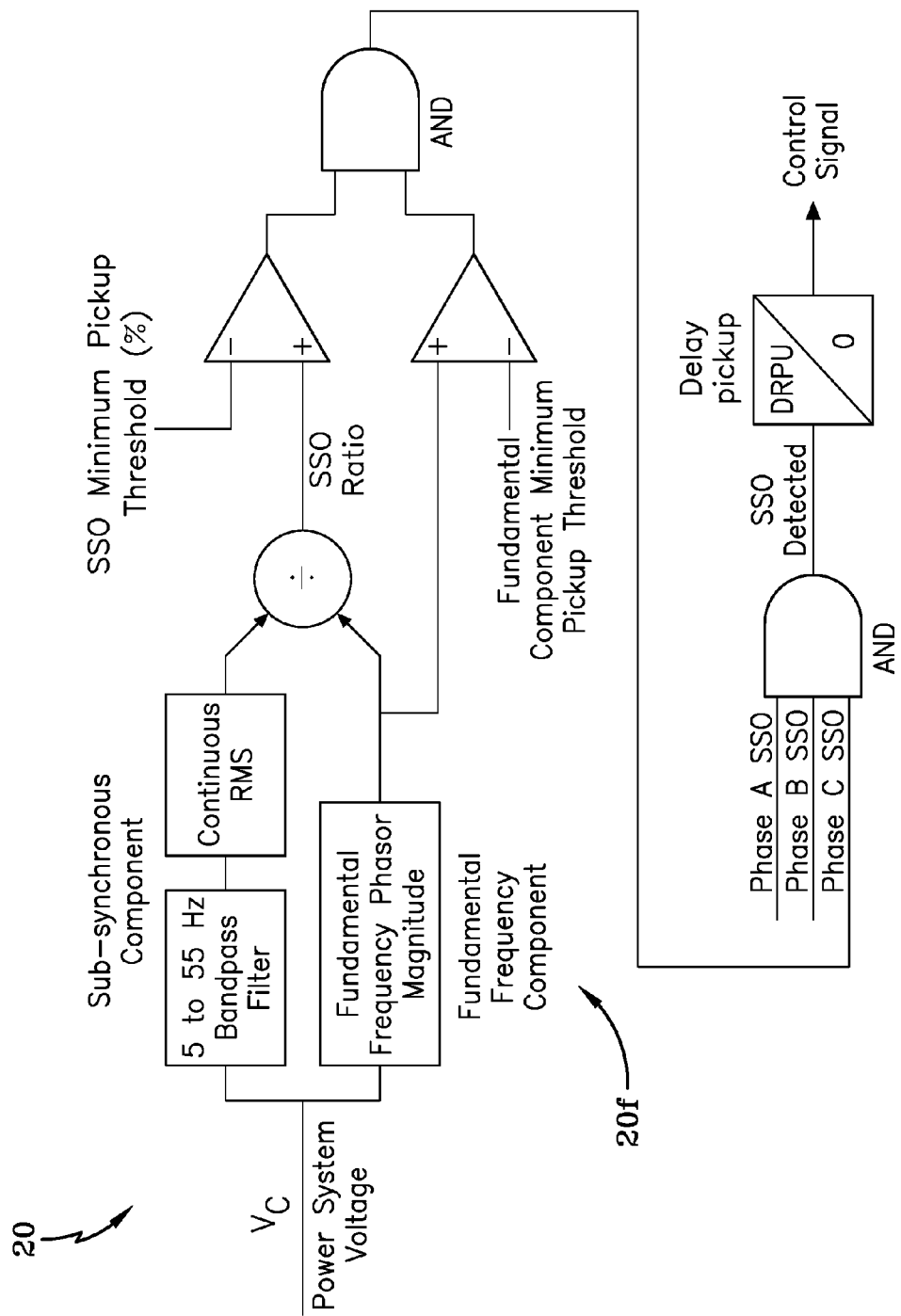
FIG.7B,(c)

| SSO Relay Stage Setting | Enabled (Y/N) | Pickup (%) | Delay (S) | Action |
|---|---|---|---|---|
| SSO-V-Stage 1 | Y | 5 | 0.5 | Alarm |
| SSO-V-Stage 2 | Y | 20 | 0.05 | Bypass Series Capacitor Bank |
| SSO-V-Stage 3 | Y | 50 | 0.01 | Bypass Series Capacitor Bank |
| SSO-V-Stage 4 | Y | 100 | 0 | Bypass Series Capacitor Bank |
| SSO-I-Stage 1 | Y | 30 | 0.2 | Alarm |
| SSO-I-Stage 2 | Y | 50 | 0.1 | Bypass Series Capacitor Bank |
| SSO-I-Stage 3 | Y | 100 | 0.05 | Bypass Series Capacitor Bank |
| SSO-I-Stage 4 | Y | 150 | 0.01 | Bypass Series Capacitor Bank |

FIG.12

SUBSYNCHRONOUS OSCILLATION RELAY

TECHNICAL FIELD

Exemplary embodiments described herein are directed to devices and methods for detecting and reacting to subsynchronous oscillations in electrical energy transmission systems.

BACKGROUND

Electrical energy generation and transmission is a well-known and well-established industry. For many decades, power plants have used turbine generators to produce electrical energy. These power plants commonly operate on non-renewable fuels such as coal and natural gas, or on nuclear fuels, which are typically used to produce steam for turning the turbine generators. Simple cycle and combined cycle natural gas plants utilizing combustion gas turbines are also now playing a larger role in producing electrical energy due to lower natural gas prices and efforts to limit greenhouse gases. Furthermore, combustion turbine-generators comprising a gas turbine engine and a generator are being increasingly used to supply electrical energy during peak loading periods. These combustion turbine-generators may be fueled with, for example, natural gas. Combustion turbine-generators may also be combined with a heat recovery steam generator (HRSG) to form a natural gas combined cycle plant, as would be understood by one of skill in the art.

More recently, there has been an increased focus on the production of electrical energy using renewable energy sources, such as wind power, wave power and solar energy. To this end, large-scale solar power and wind power farms have been built and are now in operation. While solar cells can convert light energy directly into electrical energy, utilizing wind power normally requires the use of a specialized turbine generator or some other type of rotational generator device.

Whether produced by a traditional or renewable energy power plant, generated high-voltage electrical energy is normally transported via transmission lines to substations for distribution to end users. As the process of traditional electrical energy generation has been advanced and refined over many years, so too has the process of transporting electrical energy from a location of generation to a location of use. Furthermore, the rapid growth of the renewable energy industry, especially wind energy, has required the development and installation of new electrical energy transmission infrastructure. As with known and existing electrical energy transmission infrastructure, this new renewable energy infrastructure is utilized to transfer electrical energy from the locations of often remote wind (and other) generation sources to typically heavily populated areas of use.

Because of the long distances over which generated electrical energy must often be transported, a more advanced type of transmission line—known as a series-compensated transmission line—is now frequently employed. As would be understood by one of skill in the art, a series-compensated transmission line differs from a typical transmission line at least due to the inclusion of a plurality of capacitors that are placed in series with the transmission line. Typically, these capacitors are arranged in a bank, or banks, to which a high-voltage transmission line is connected. The capacitors themselves may be arranged in series and/or parallel.

Among other benefits, a series-compensated transmission line provides expanded energy transfer capability in comparison to an uncompensated transmission line at the same voltage level. Consequently, series-compensated transmission lines provide a more economical solution to the long distance transmission of electrical energy.

While series-compensated transmission lines offer an advantage over traditional (non-compensated) transmission lines, as described above, it has been discovered that the series capacitor banks of series-compensated transmission lines, coupled with transmission line reactance, can create natural resonant frequencies on the associated transmission networks. It has also been determined that if the natural resonant frequency of a transmission network is the synchronous frequency complement of any of the natural mechanical frequencies of the spring-mass system of a connected turbine-generator, the turbine system may experience subsynchronous resonance (SSR) that can damage the turbine-generator shaft.

There are several known ways in which SSR can negatively affect a turbine generator system. For example, Torsional Interaction (TI), Induction Generator Effect (IGE), and Torque Amplification (AI) are all known effects of SSR on traditional fossil fuel generators. See, e.g., P. M. Anderson, and R. G. Farmer, *Series Compensation of Power Systems*, ISBN 1-888747-01-3.

SSR can also negatively affect renewable electrical energy generation devices. In fact, the use of series-compensated transmission lines in conjunction with renewable electrical energy generation devices has revealed a new type of power system subsynchronous interaction. More specifically, this new type of power system subsynchronous interaction occurs between series-compensated transmission lines and wind turbines—particularly, Type-3 wind turbine-generators (WTG). Type-3 WTGs typically have a wind turbine shaft that is coupled via a gearbox to a Double Fed Induction Generator (DFIG). A stator portion of the DFIG is normally connected directly to the power grid, while a rotor portion of the DFIG is connected to the power grid through a power converter system based on power electronics. A crowbar circuit is commonly also present to prevent an overvoltage or overcurrent condition of the DFIG from damaging the power converter system. In the event of such a condition, the rotor side output of the DFIG is disconnected from the power converter system and connected to the crowbar circuit until the fault condition is cleared.

One particular and real-world example of such a wind turbine power system subsynchronous interaction occurred within the Electric Reliability Council of Texas (ERCOT) region in October 2009. In this case, a subsynchronous interaction occurred because the control electronics of a Type-3 WTG reacted so quickly to a detected system disturbance that modes of oscillation were created in the associated series-compensated transmission networks. More specifically, the ERCOT event was triggered by a fault on one of two series-compensated 345 kV transmission lines that export the power generated by two wind farms. The protection system control electronics correctly tripped the faulted line according to design to isolate the fault within 3 cycles. However, the loss of one transmission line left the two wind farms radially connected to the other series-compensated transmission line and, consequently, the oscillation began.

FIGS. 1A-1B graphically depict the line currents and bus voltages, respectively, as recorded by a digital relay at the interconnection point of the wind farm and the transmission grid during the ERCOT event. A dedicated digital fault recorder at the series capacitor bank site also recorded the series capacitor current through the complete sequence of the event. The recorded series capacitor current is shown in FIG. 2.

As can be observed, after about 200 milliseconds into the ERCOT oscillation event, the bus voltage at the interconnection point reached 1.45 per unit, and the current magnitude of the combined, two wind-farm output, increased to about 9 times that of the pre-fault current magnitude. It is at this point that damage to the wind turbine crowbar circuit was estimated to have started.

During the entirety of the oscillation event—which lasted for only about 1.5 seconds—the only protection system reaction that occurred was the closing of a series capacitor bank bypass breaker at the instruction of the capacitor bank control system when the Metal Oxide Varistors (MOVs) thereof started conducting excessively. The MOV conducting current during the course of the oscillation event is graphically shown in FIG. 3.

The spectrum analysis of the recorded line current and bus voltage after the ERCOT event line fault reveals significant subsynchronous oscillation (SSO). FIGS. 4A-4B graphically represent the spectrum of the phase currents and voltages, respectively, that occurred during the ERCOT oscillation event. It may be observed that the spectrum plots of all three phases reveal a very similar spectrum signature, and the frequency of the subsynchronous component is approximately 24 Hz. The spectrum of the line currents further reveals that the magnitude of the subsynchronous component is 250% larger than the fundamental frequency component, while the magnitude of the bus voltage subsynchronous component is about 30% of the fundamental frequency component. That is, the subsynchronous component within the current signal is more obvious than the subsynchronous component within the voltage signal.

The above-described 1.5 second ERCOT subsynchronous oscillation event accompanied by the depicted overvoltage caused damage to several wind generators and had an adverse effect on the fatigue life expenditure of other system equipment.

Subsequent, detailed simulation of the ERCOT (and other) oscillation event data has revealed that the frequency of oscillation in such an event could range from about 5 Hz to 55 Hz in power systems having a fundamental frequency of 60 Hz and about 5 Hz to 45 Hz in power systems having a fundamental frequency of 50 Hz. If the subsynchronous resonance is caused by interaction between the series capacitor banks and the renewable generation control system, the oscillation is referred to as Subsynchronous Control Interaction (SSCI).

Interestingly, SSCI problems are not necessarily limited to renewable electrical energy generation systems. Rather, SSCI can potentially cause damage to the shaft system of traditional steam turbines, and in extreme cases, to the shaft system of combustion gas turbines as well. For example, if one of the resonance frequencies of the series compensated transmission network is close to the complementary mechanical system frequency of the shaft of a traditional steam turbine generator connected to the same power grid, then the two oscillatory systems can interact with each other. In the same operating conditions, the interaction can result in damaging shaft torques on a steam turbine generator shaft.

For entities (e.g., utilities) that may encounter subsynchronous resonance (SSR) problems, protective relays have become an important component of the overall strategy of protection. For example, a known torsional stress relay (TSR), which is based on shaft speed measurement, was developed years ago and has been widely applied to protect generator shafts. However, known relays, such as but not limited to the TSR, cannot address the unique challenges associated with SSCI.

SSCI also poses challenges to even modern digital relays, because the signal processing algorithms of such relays are typically designed to extract fundamental frequency signals and to filter out non-fundamental frequency signals. In this regard, see, e.g., L. G. Gross, *Sub-synchronous Grid Conditions: New Event, New Problem, and New Solutions,* 37th Annual Western Protective Relay Conference, Spokane, Wash., October, 2010.

Efforts have been made to reconstruct the sub-harmonic operational quantities frequently associated with an electrical energy generation system by compensating the attenuation of digital filters that were originally designed to extract the fundamental frequency. See, e.g., E. O. Schweitzer and D. Hou, *Filtering for Protective Relays,* 19th Annual Western Protective Relay Conference, Spokane, Wash., October, 2010. While such a method can utilize a traditional relay platform, its effectiveness is nonetheless questionable because of limitations associated with signal processing.

Consequently, it can be understood that it would be beneficial to provide a mechanism by which to detect and react to such SSCI oscillation events with sufficient speed and in a manner that prevents damage to system components. Exemplary device, system and method embodiments described herein provide for such mechanisms.

SUMMARY

Exemplary subsynchronous oscillation (SSO) relay embodiments described herein generally include protection logic circuitry designed to quickly detect and react to SSCI oscillation events. Exemplary logic circuitry is provided with filtering functionality through which a SSO signal may be extracted from the fundamental frequency component of a monitored electrical energy generation system. The filtering functionality may be usable to extract a SSO signal within some predetermined range of frequencies—which range may depend on the fundamental frequency (e.g., 50 HZ or 60 HZ) of the given electrical energy generation system being monitored.

Exemplary SSO relay embodiments are also provided with corresponding software, which includes a specialized protection algorithm. The specialized protection algorithm differs from known, relevant algorithms, in that the specialized protection algorithm uses quantities of both the subsynchronous component and the fundamental frequency component of a monitored signal. Also novelly, an exemplary specialized protection algorithm may utilize the ratio of the magnitude of the subsynchronous component to the magnitude of the fundamental frequency component as an operational quantity.

Exemplary SSO relay embodiments described herein may be embodied within a generic hardware platform that facilitates a simplified and efficient bottom-up software design. An accompanying advanced signal processing design toolbox, or another technique, may be used to design a digital bandpass filter to effectively extract the subsynchronous oscillation signal as described above.

An exemplary SSO relay may be installed as a component of the control electronics associated with a given electrical energy generation system (e.g., a Type-3 WTG) to provide protection against SSCI oscillation events. Other protective devices may also be present and may provide protection functions that may or may not be employed prior to action being taken by the SSO relay. Generally, the SSO relay is in communication with a capacitor bank of a series-compensated transmission line of a given electrical energy generation system. If the SSO relay detects an oscillation event that is not countered within an allowed time period by another protective mechanism of the system, the SSO relay may react to the oscillation event by bypassing the capacitor bank. Alternatively, the SSO relay may be designed and installed so as to disconnect a wind turbine from the transmission grid in response to a SSCI oscillation event. In either case, the oscillation can be quelled before damage to system components occurs.

Other aspects and features of the exemplary embodiments will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and:

FIG. 7A schematically depicts a current-based portion of an exemplary protection logic circuit of one exemplary embodiment of a subsynchronous oscillation relay;

FIG. 7B schematically depicts a voltage-based portion of an exemplary protection logic circuit of one exemplary embodiment of a subsynchronous oscillation relay;

FIG. 12 is a table showing possible combinations of programmed subsynchronous oscillation minimum pickup threshold values and time delays before response, that may be used in one exemplary subsynchronous oscillation relay embodiment;

DETAILED DESCRIPTION OF THE EXEMPLARY EMBODIMENTS

Figure 5:
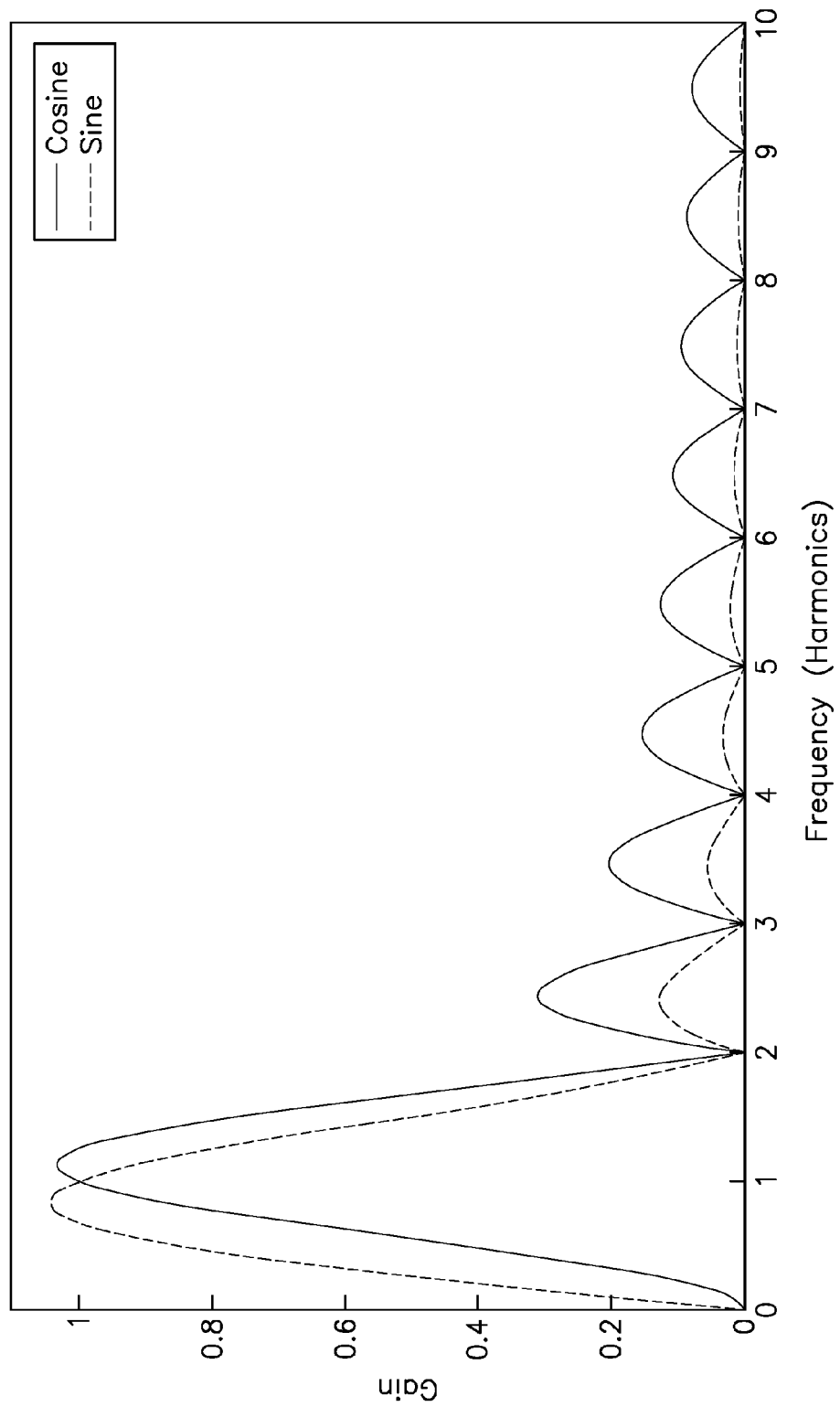
FIG. 5 graphically represents the frequency response of a typical digital relay that may be used to provide traditional protection functions based on fundamental frequency quantities.

For electrical energy generation system transient faults, such as line to ground faults, the measured line currents contain mainly the fundamental frequency current and a decaying DC component. As a result, traditional digital relay design applies digital signal processing to filter the DC component and other non-fundamental frequency components. In this regard, the frequency response of a typical Fourier filtering method by which sine and cosine filters are applied to respectively extract the real part and the imaginary part of current or voltage phasors at the fundamental frequency, is graphically shown in FIG. 5.

It is noted that such filters provide unit gain at the fundamental frequency and remove the DC and other high order harmonic components. Consequently, the characteristics of Fourier filtering may work quite well for traditional protection functions that are based on fundamental frequency quantities. In contrast, such a signal processing scheme does not work well for subsynchronous oscillation detection because the filtering provides significant attenuation at the subsynchronous frequency range, which is commonly between 5 Hz to 55 Hz (or 5 Hz to 45 Hz). Thus, while known digital relay platforms may provide programming flexibility that allows end users to develop customized protection functions, limitations associated with signal processing implementation prevent such generic digital relay platforms from being effectively used to manage SSCI oscillation events.

Figure 6:
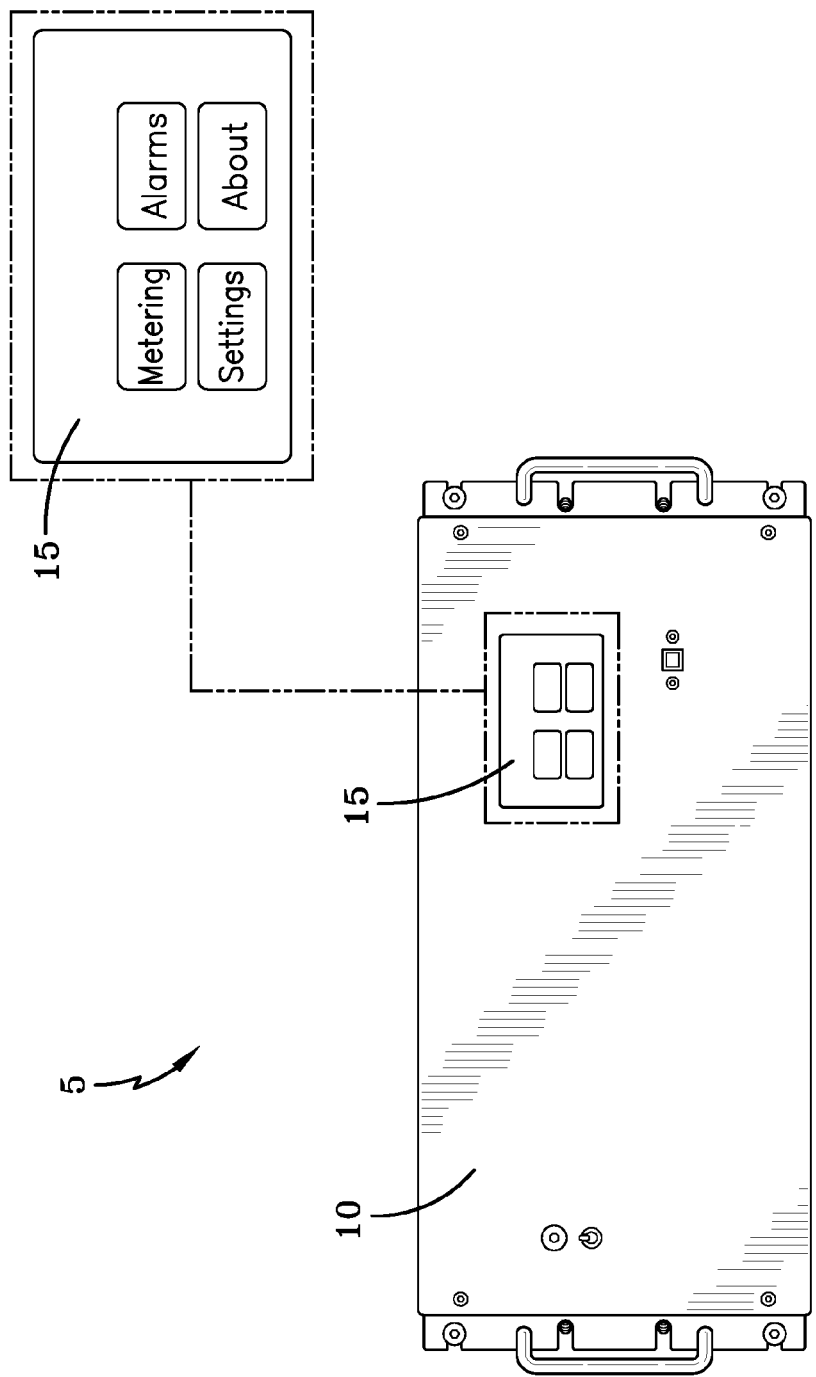
FIG. 6 is an external-front view of one exemplary subsynchronous oscillation relay embodiment.

A front view of one exemplary embodiment of a subsynchronous oscillation (SSO) relay 5 is shown in FIG. 6. As shown, the exemplary SSO relay 5 includes a case 10 that houses the electronics of the relay. One or more displays 15 may be present to, for example, indicate relay status and/or alarms, to act as a user interface, etc.

Exemplary SSO relay embodiments described herein do not suffer from the same shortcomings as known digital relay platforms. Exemplary SSO relay embodiments described herein generally include protection logic circuitry designed to quickly detect and react to SSCI oscillation events. One example of such protection logic circuitry 20 is schematically illustrated in FIGS. 7A-7B.

As shown in FIGS. 7A-7B, a protection logic circuit is provided to monitor each of the three phases of the electrical energy being generated. Furthermore, in this exemplary embodiment, protection logic circuitry 20a-20c, 20d-20f is separately and respectively associated with both the current and voltage aspects of said electrical energy. Consequently, there are six separate protection circuits operating in parallel in this exemplary SSO relay circuitry embodiment.

Figure 8:
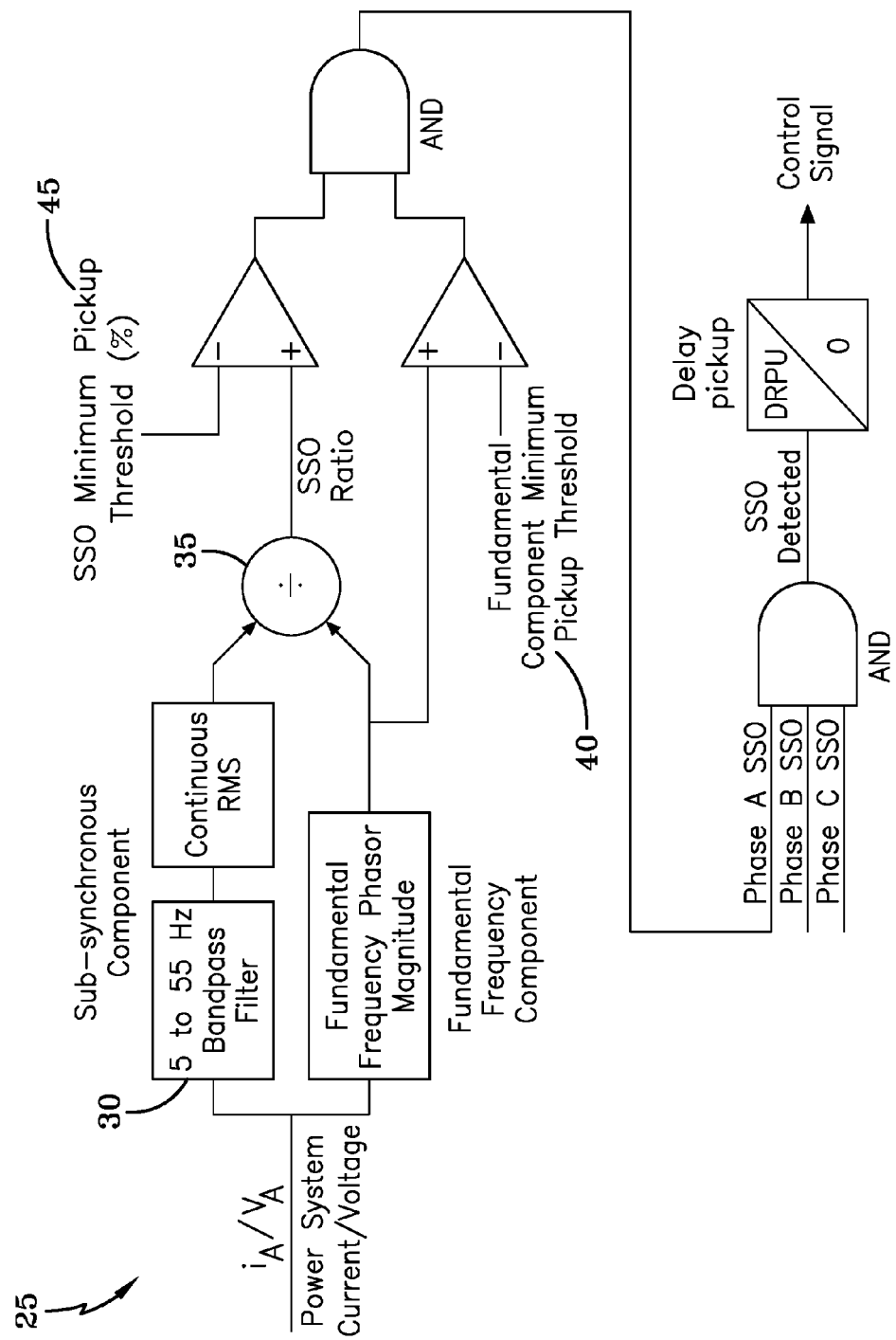
FIG. 8 is an enlarged view of generalized exemplary protection logic circuitry of one exemplary embodiment of a subsynchronous oscillation relay.

An enlarged view of a generalized exemplary protection logic circuit 25 is provided in FIG. 8. As may be observed in FIG. 8, the protection logic circuit 25 is provided with filtering functionality through which a SSO signal may be extracted from the fundamental frequency component of a monitored electrical energy generation system. More particularly, the exemplary protection logic circuit 25 is provided with a specialized digital bandpass filter 30 to effectively extract the subsynchronous oscillation signal wherein the upper cut-off frequency is set to about 5 Hz less than the system normal frequency, for example, 55 Hz in a 60 Hz system and 45 Hz in a 50 Hz system.

Figure 9:
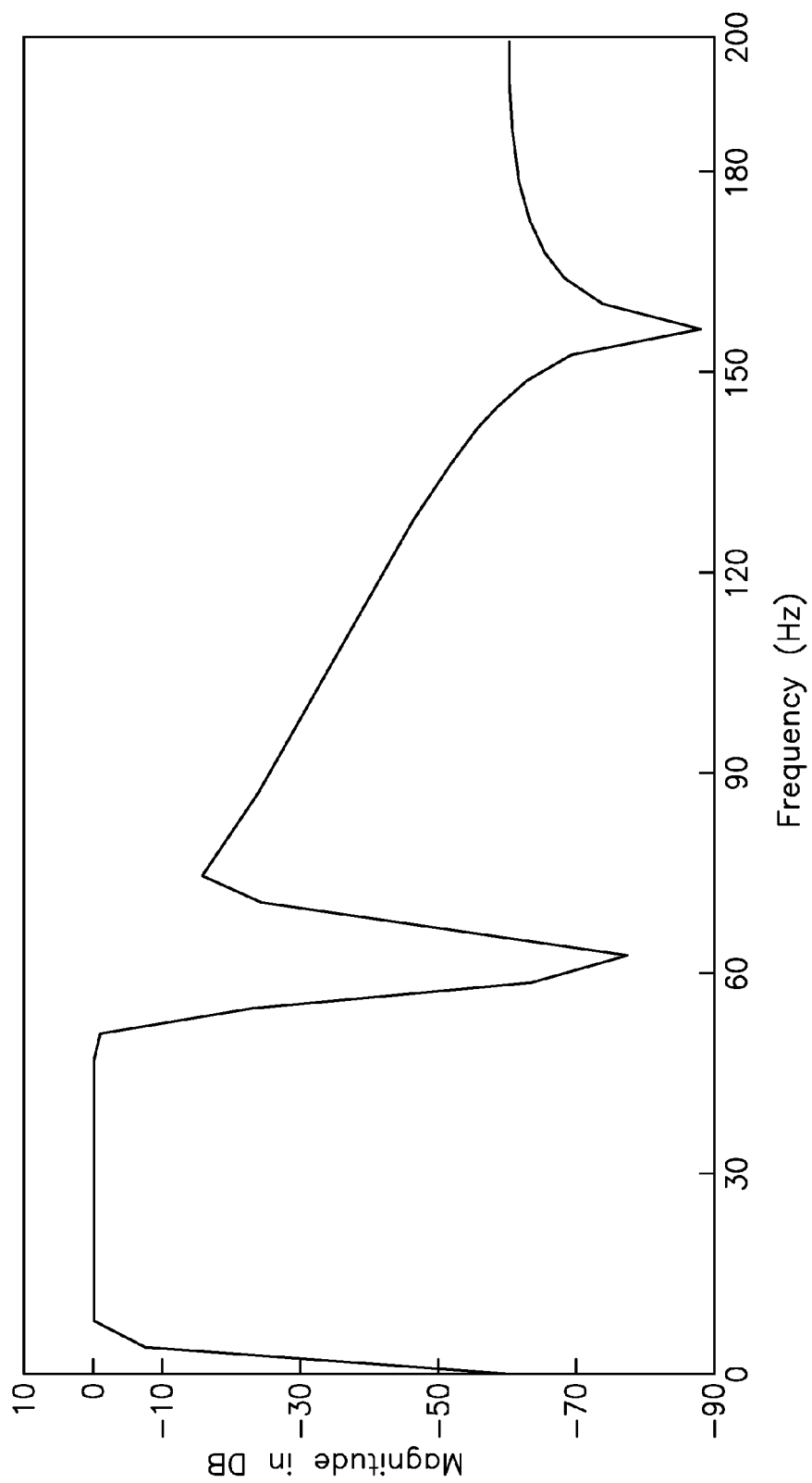
FIG. 9 graphically represents the frequency response of one exemplary bandpass filter that may be used in an exemplary subsynchronous oscillation relay embodiment.

The exemplary bandpass filter 30 is one embodiment of a bandpass filter design that provides unit gain over 5 Hz to 55 Hz and additional attenuation at the fundamental frequency of 60 Hz. The frequency response of the bandpass filter 30 is graphically depicted in FIG. 9, and can be seen to have in excess of −60 dB attenuation at a fundamental frequency of 60 Hz, which is the typical fundamental frequency for most electrical energy generation systems in North America. The bandpass filter 30 also provides unit gain over the 5 Hz to 55 Hz frequency range. By passing the voltage and current signals through the bandpass filter, the instantaneous subsynchronous oscillation component of the monitored signals may be obtained.

Figure 1A:
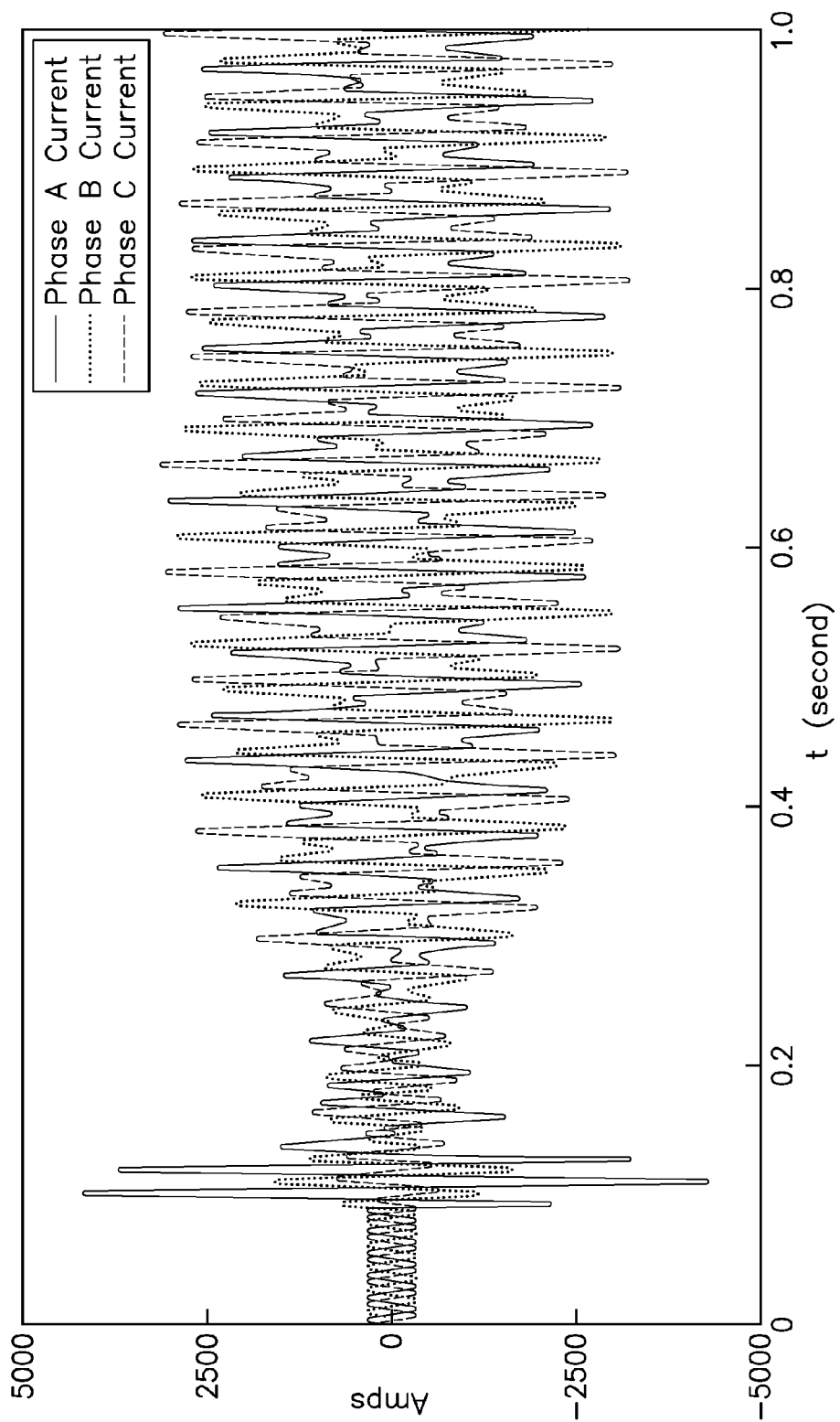
FIG. 1A graphically represents recorded line currents over time at the interconnection point of a wind farm and associated transmission grid during an exemplary subsynchronous oscillation event.
Figure 1B:
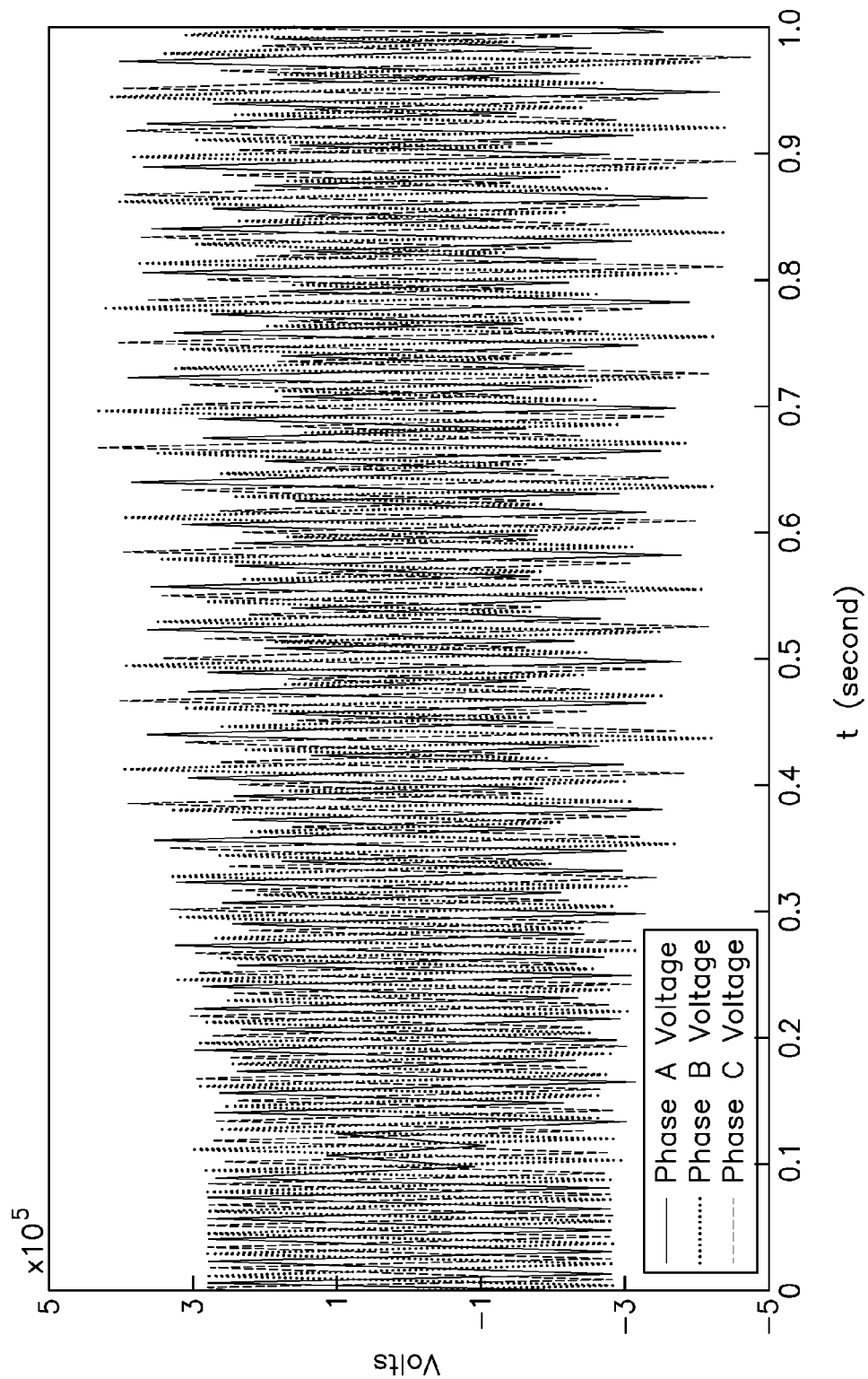
FIG. 1B graphically represents recorded bus voltages over time at the interconnection point of the wind farm and associated transmission grid during the exemplary subsynchronous oscillation event of FIG. 1A.
Figure 2:
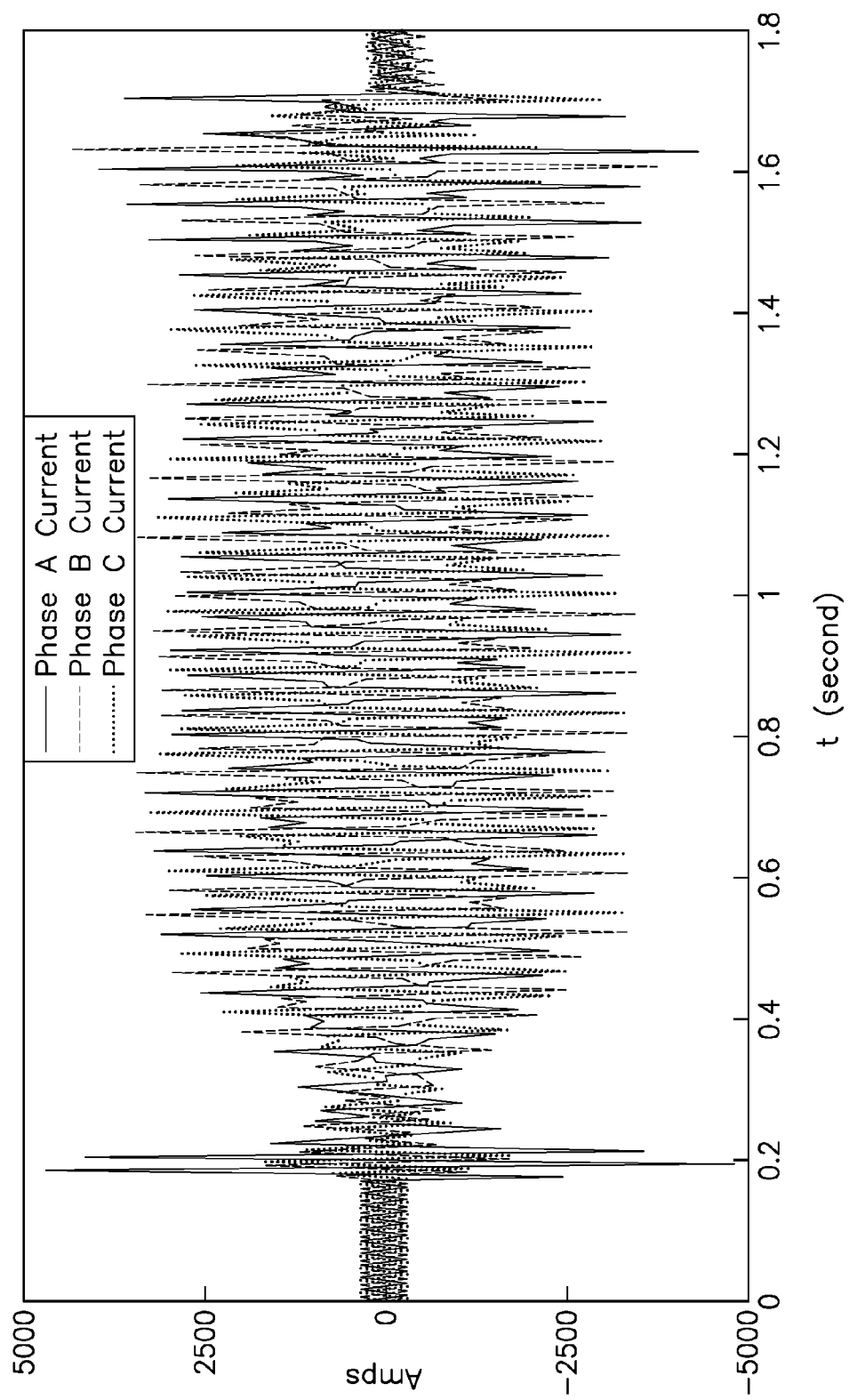
FIG. 2 graphically represents recorded current values of a connected series capacitor bank during the same subsynchronous oscillation event.
Figure 3:
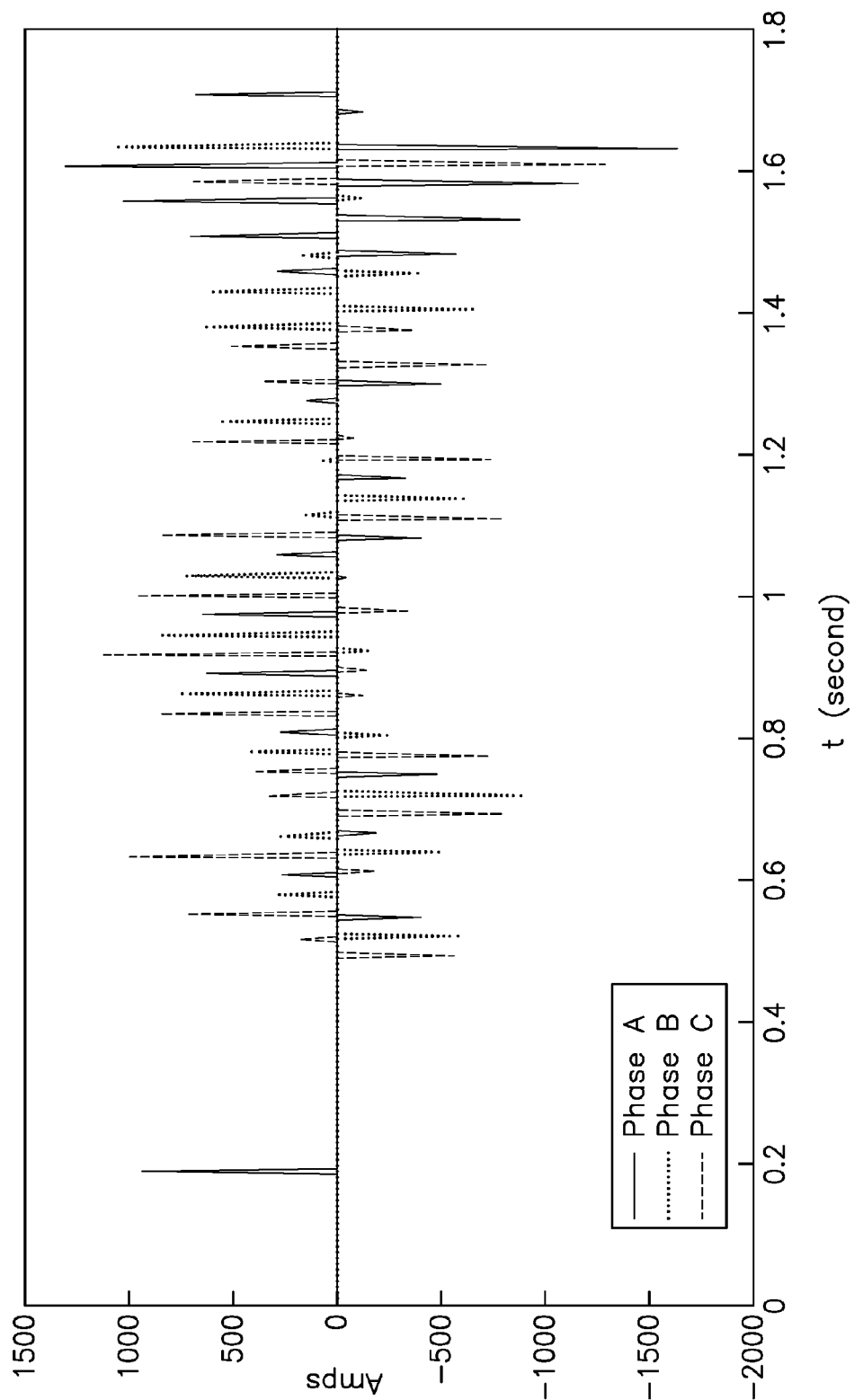
FIG. 3 graphically represents recorded conducting currents of the series capacitor bank referred to in FIG. 2 during the same subsynchronous oscillation event.
Figure 4A:
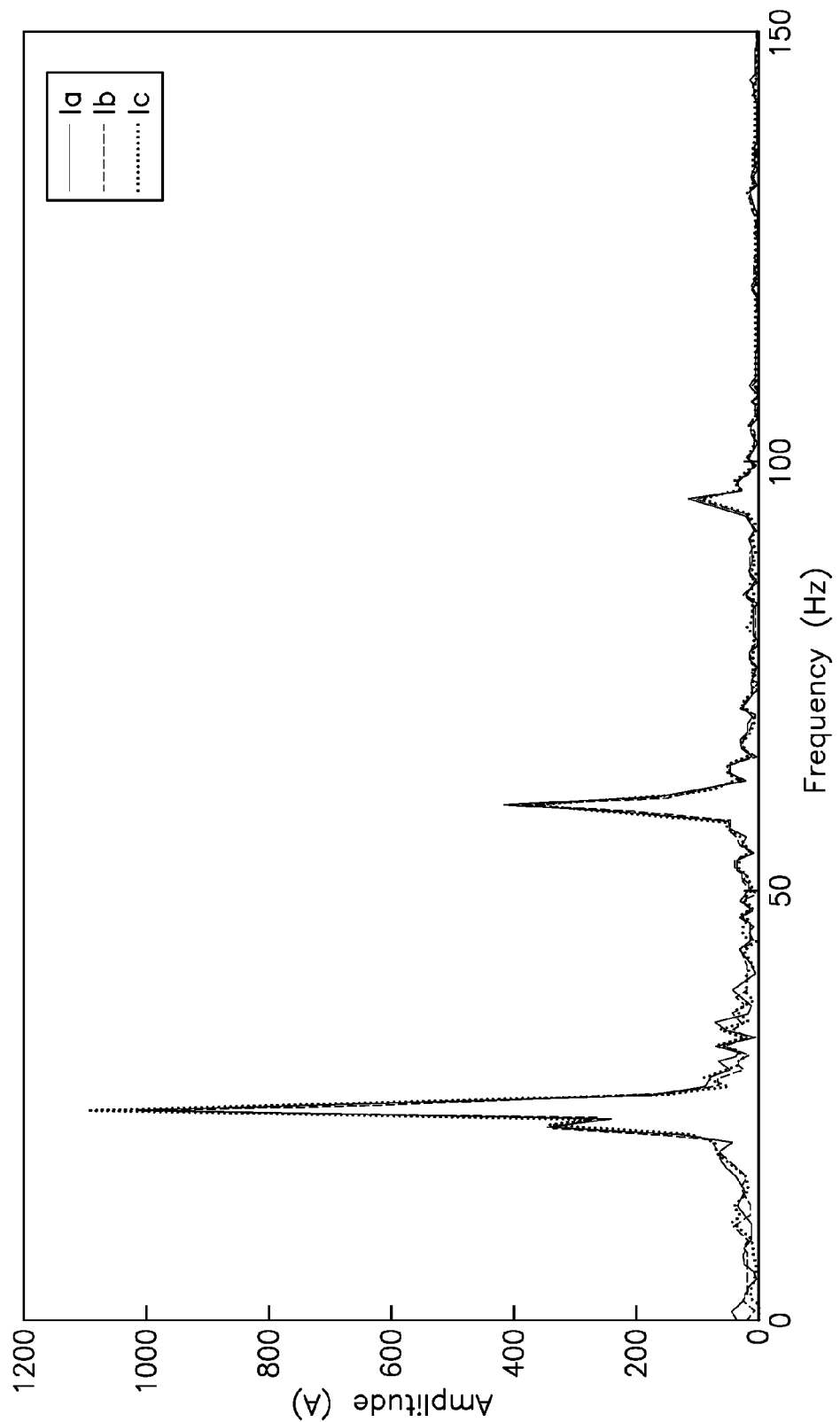
FIG. 4A graphically represents the recorded spectrum of line phase currents at the interconnection point during the same subsynchronous oscillation event.
Figure 4B:
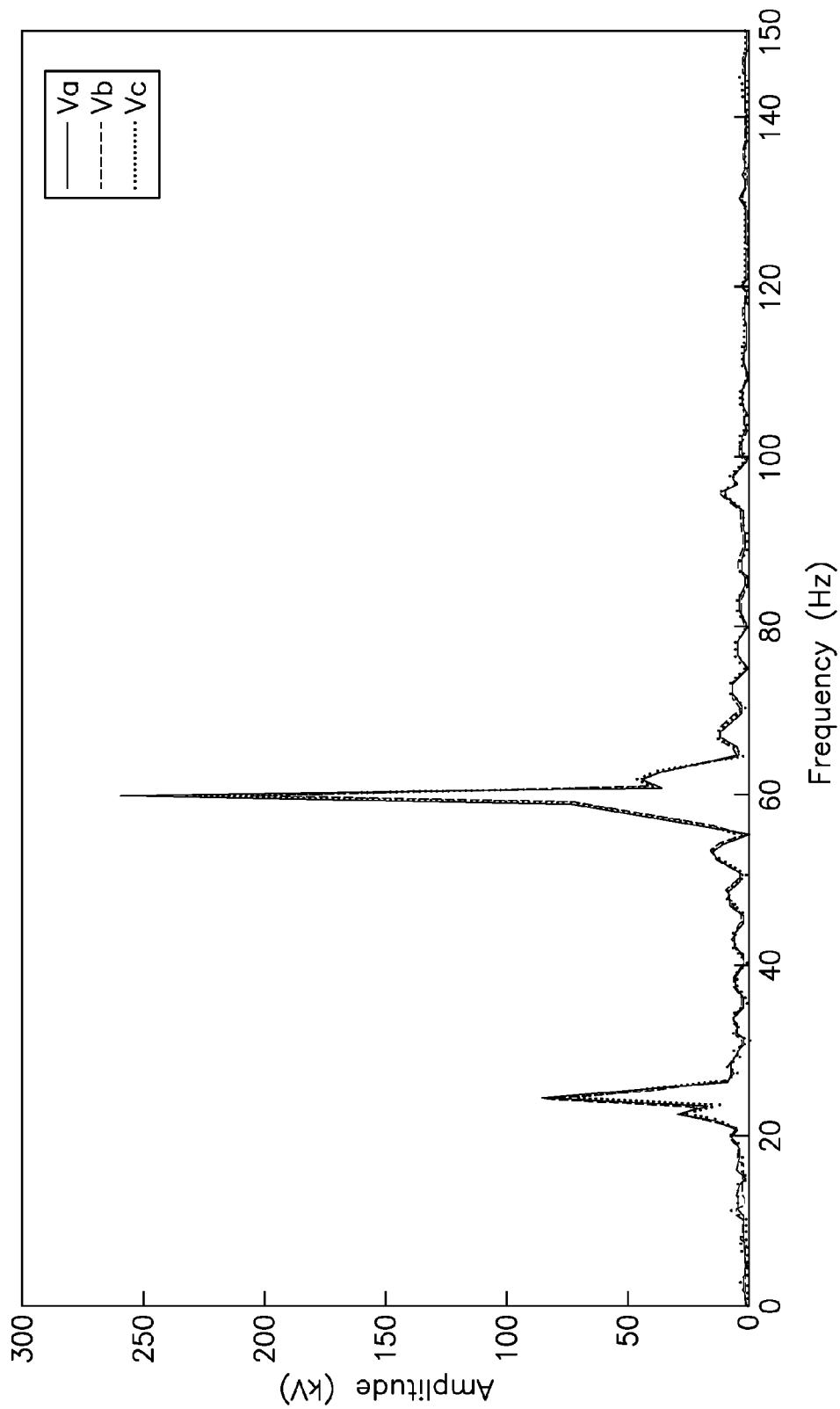
FIG. 4B graphically represents the recorded spectrum of line phase voltages at the interconnection point during the same subsynchronous oscillation event.
Figure 10A:
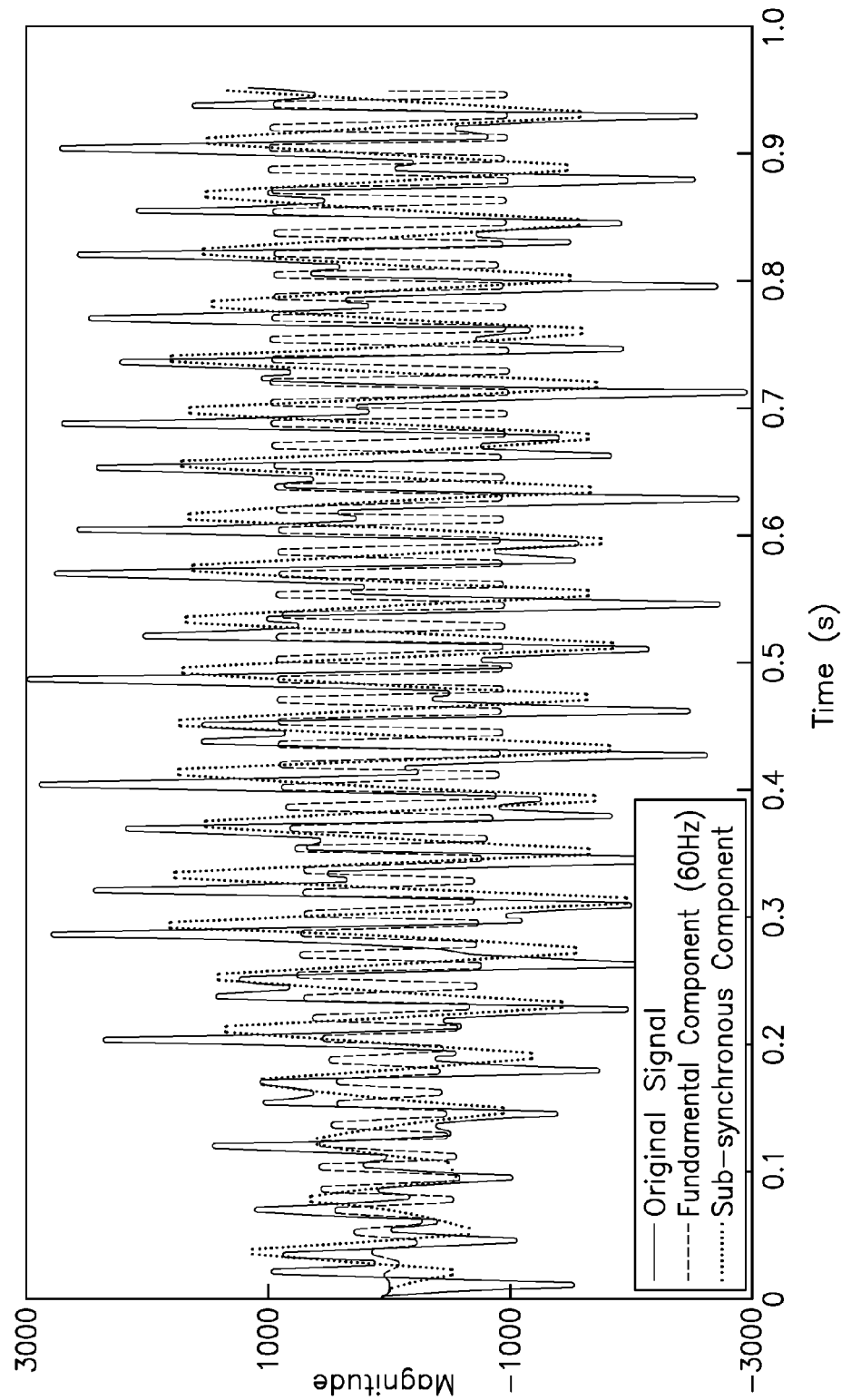
FIG. 10A graphically depicts a filtered subsynchronous oscillation component in comparison to a fundamental 60 Hz component in the recorded original current signal of one exemplary subsynchronous oscillation relay during testing.
Figure 10B:
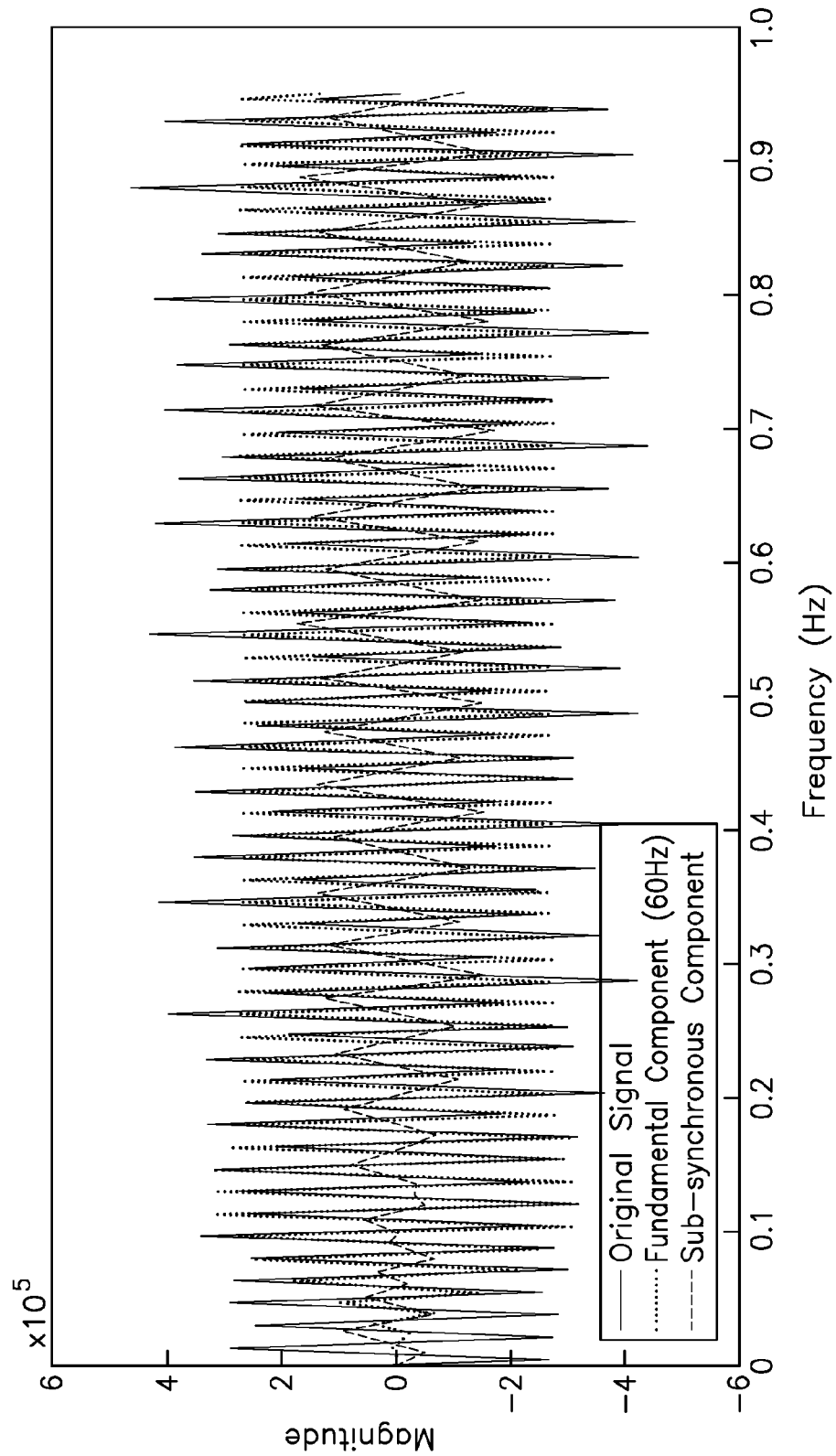
FIG. 10B graphically depicts a filtered subsynchronous oscillation component in comparison to a fundamental 60 Hz component in the recorded original voltage signal of the exemplary subsynchronous oscillation relay of FIG. 9A during testing.

Referring now to FIGS. 10A-10B, a subsynchronous oscillation component (dotted line) as extracted by the exemplary bandpass filter 30 of the protection logic circuitry 20 of FIGS. 7A-7B is respectively shown in side-by-side comparison with the fundamental (60 Hz) component (dashed line) of the recorded current and voltage signal. It may be observed from FIG. 10A that the magnitude of subsynchronous component is significantly larger than the magnitude of the fundamental (60 Hz) component of the current signal, which matches the magnitude shown in the spectrum plot of FIG. 4A. Under normal electrical energy generation system operation, it is not expected that a signal with any significant magnitude will be observed being output from the bandpass filter of an exemplary SSO relay.

Exemplary SSO relay embodiments are also provided with corresponding software, which includes a specialized protection algorithm. As mentioned briefly above, a specialized protection algorithm of an exemplary SSO relay embodiment differs from known, relevant algorithms that use the fundamental frequency quantities. More particularly, a specialized protection algorithm of an exemplary SSO relay embodiment makes use of quantities of both the subsynchronous component and the fundamental frequency component of a monitored signal (see FIGS. 7A-7B). In contrast, a more simplistic oscillation detection method might only compare the magnitudes of the low frequency signal to a predefined threshold to determine whether action needs to be taken. However, system studies and simulations have revealed that the magnitude of a SSO depends on various system operation conditions, including the base load conditions. Thus, it may be somewhat challenging to determine a universal threshold.

In light of the aforementioned challenge with respect to determining a universal, predefined threshold, an exemplary specialized protection algorithm of an exemplary SSO relay embodiment may calculate the ratio 35 of the magnitude of the subsynchronous component to the magnitude of the fundamental frequency component as an operational quantity, as represented in the logic circuit of FIGS. 7A-7B. The calculated ratio is then compared with a threshold setting(s) which, if exceeded, indicates the existence of a SSO event and may cause the SSO relay to take remedial actions, such as an action that for example, results in by-passing the series capacitor banks. To bridge the gap between two components with different frequencies, the Root Mean Square (RMS) method may be used to calculate the magnitude of each component. For discrete sampled values, the RMS value may be calculated according to Equation 1, where n is the number of samples.

$$X_{rms} = \sqrt{\frac{1}{n}(X_1^2 + X_2^2 + \ldots + X_n^2)} \quad (1)$$

Based on a typical electrical energy generation system fundamental frequency of 60 Hz and on other experimental observations, an exemplary SSO relay protection algorithm may be designed to detect a SSO with a frequency of between, for example, 5 Hz to 55 Hz. A 100 millisecond default RMS calculation window may also be chosen, as 100 milliseconds is sufficient to cover one complete cycle at an oscillation frequency of 10 Hz. For an oscillation frequency of 25 Hz, a 100 millisecond default RMS calculation window covers 2.5 cycles of oscillation, which is sufficient to calculate the magnitude of the oscillation.

To overcome the limitation of having a fixed window size that may delay the SSO detection speed, a continuous RMS (CRMS) calculation may be implemented. The traditional RMS method will calculate a result after collecting n new samples. The CRMS method updates the RMS value for every new sample as shown in Equation 2.

$$Xrms_i = \sqrt{X_{rms_{i-1}}^2 + \frac{1}{n}(X_i^2 - X_{i-n}^2)} \quad (2)$$

The CRMS method is also an iterative process that can be efficiently implemented on various hardware platforms.

Figure 11:
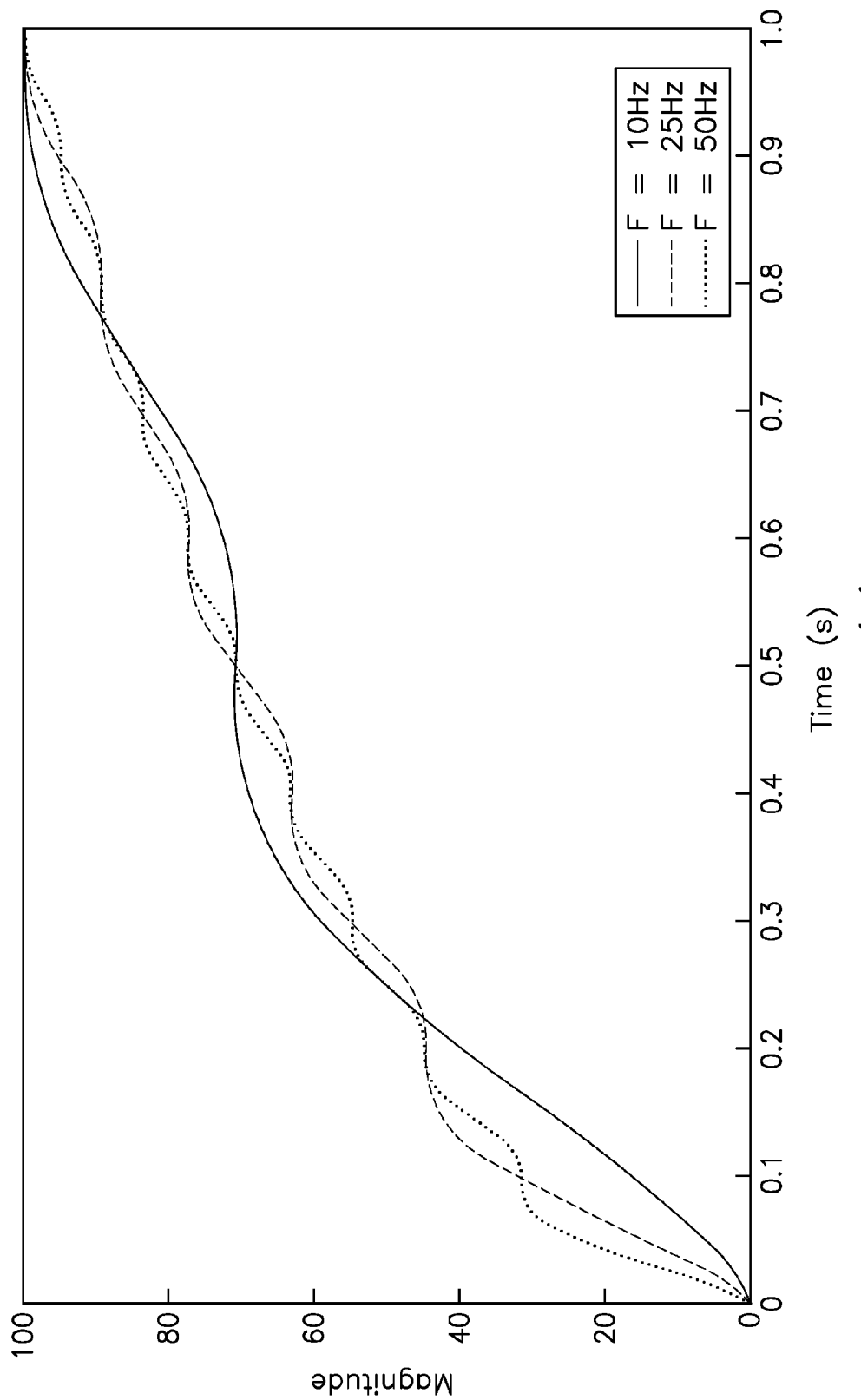
FIG. 11 graphically represents how the calculated continuous root mean square value associated with a subsynchronous oscillation event continues to increase as the oscillation progresses.

Another advantage of employing a CRMS calculation is that the CRMS includes an inherent time inverse characteristic that reduces the amount of time required by the SSO relay to detect strong subsynchronous oscillations. For example, if the time window of CRMS is set as 100 ms and the oscillation is strong, the calculated CRMS can pass the threshold before 100 ms and the relay will detect the SSO condition before the 100 ms delay. This inverse time characteristic is generally illustrated in the graph of FIG. 11, where it may be observed how the calculated CRMS value increases as an oscillation progresses.

As represented in the exemplary logic circuit of FIG. 7, an exemplary protection algorithm of an exemplary SSO relay embodiment may also utilize a selectable fundamental component minimum pickup threshold value 40 and a SSO minimum pickup threshold value 45. The SSO minimum pickup threshold value setting ensures that SSO protection is enabled only under minimum load conditions.

The SSO minimum pickup threshold may be set as a percentage of the fundamental frequency component. For current-based SSO protection using an exemplary SSO relay embodiment, it has been determined through experimentation and testing that a default SSO minimum pickup threshold value of about 50% provides good results. For voltage-based SSO protection using an exemplary SSO relay embodiment, it has been determined through experimentation and testing that a default SSO minimum pickup threshold value of about 20% provides good results. Such default minimum pickup threshold setting values will provide enough security and detection speed for any SSO event described above. The use of other default SSO minimum pickup threshold values is, however, also possible.

The time required to detect a SSO may be adjusted by selecting different combinations of the CRMS calculation time window and the SSO minimum pickup threshold. For example, if the CRMS calculation time window is set to 100 milliseconds and the SSO minimum pickup threshold is set to 60%, it will take only about 30 milliseconds instead of 100 milliseconds to detect a SSO with a frequency of 10 Hz and an amplitude of 141.4 ($100\sqrt{2}$).

Since SSO is a 3-phase phenomenon, it may be preferable to require detection of an oscillation in all three phases before permitting initiation of a response by an exemplary SSO relay. Consequently, a further finite time delay may be added after SSO detection to provide additional security under the discretion of the specific application. That is, a time delay may be provided to better ensure that a SSO relay will only react in response to an actual SSCI event—not to another event such as a lightning strike, etc. The use of a time delay provides an opportunity for other system protection mechanisms to properly react to non-SSCI events before an SSO relay will take action. In this regard, it has been determined that a SSO relay having a SSO minimum pickup threshold value set to 50% and a time delay before response set to 0.1 seconds (see FIG. 12), should allow the SSO relay to adequately detect and react to a SSO event in most electrical energy generation systems.

It should also be noted that multiple setting stages having different corresponding reactions may be provided in an exemplary SSO relay. That is, different combinations of SSO minimum pickup threshold values and time delays before response may be programmed for selection by a user, or created by a user. For example, and without limitation, an exemplary SSO relay may be provided with four setting stages for each of a current based and voltage based SSO detection and reaction. An example of several possible SSO minimum pickup threshold values and time delays before response are shown in the table of FIG. 12.

Figure 13:
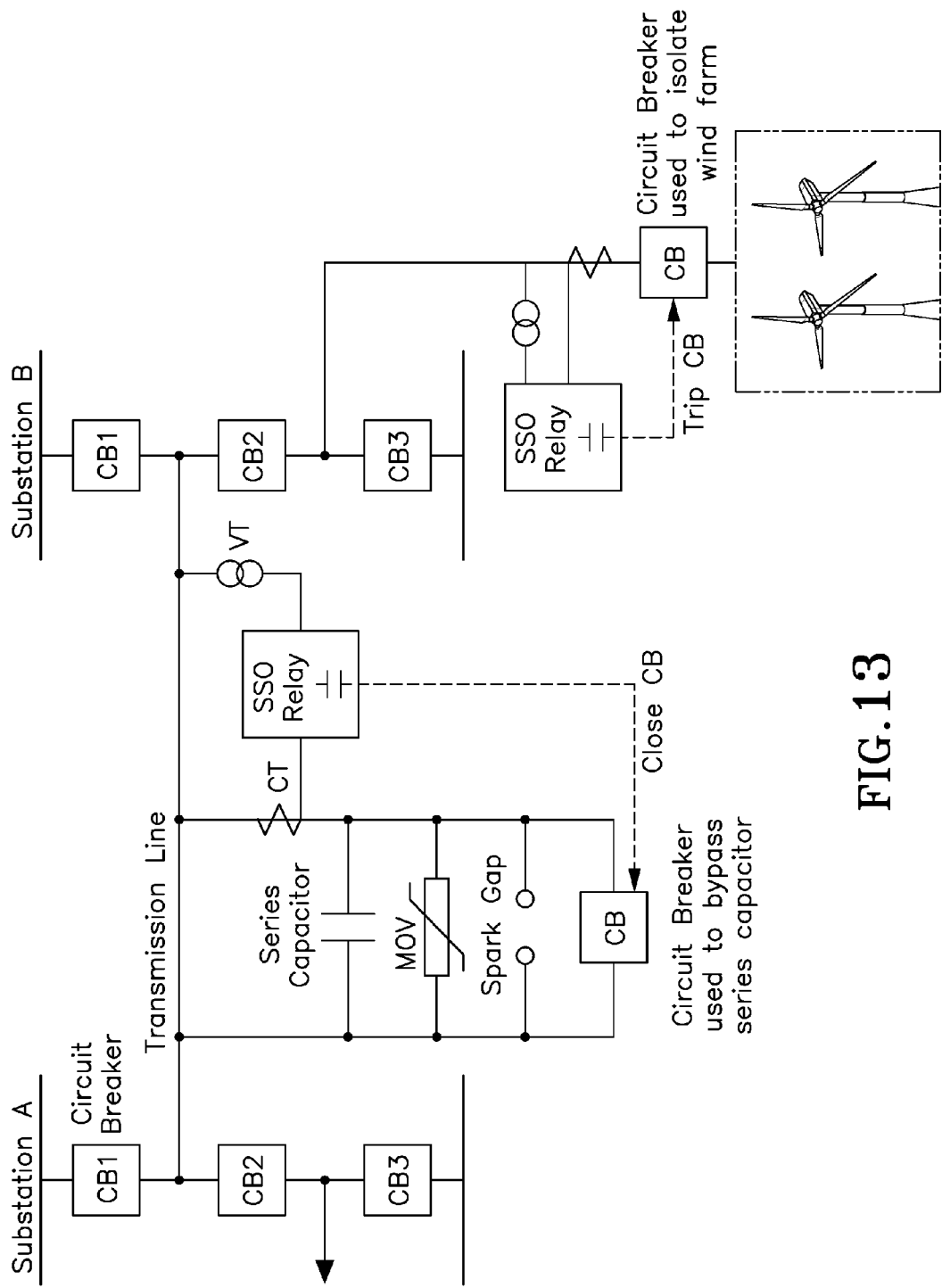
FIG. 13 schematically represents the use of exemplary subsynchronous oscillation relays located in a power transmission system to execute a protection protocol upon detection of a subsynchronous oscillation event.

As suggested by the listed "Actions" in FIG. 12 and as mentioned above, an exemplary SSO relay embodiment may react to a detected SSO event in various ways. A very simplistic reaction may be to simply activate a visual and/or audible alarm—in which case user interaction is required to actually prevent any potential damage from the event. Alternatively, and as schematically represented in FIG. 13, an exemplary SSO relay may itself initiate a protection protocol in the case of a detected SSO event. For example, and without limitation, upon detection of an SSO event an exemplary SSO relay may be adapted (e.g., by way of a signal from its controller) to activate a circuit breaker or another device that functions to bypass a capacitor bank of a series-compensated transmission line to which the SSO relay is connected. Alternatively, or in addition thereto, an exemplary SSO relay may be adapted to activate a circuit breaker or another device that functions to disconnect (isolate) a wind turbine from the transmission grid to which the SSO relay is connected. This may be accomplished, for example, by sending an appropriate signal (such as from a SSO relay controller) to the circuit breaker or to a switch, relay or other external device that is associated with the capacitor bank and/or wind turbine and capable of performing the bypass or disconnection function.

Figure 14:
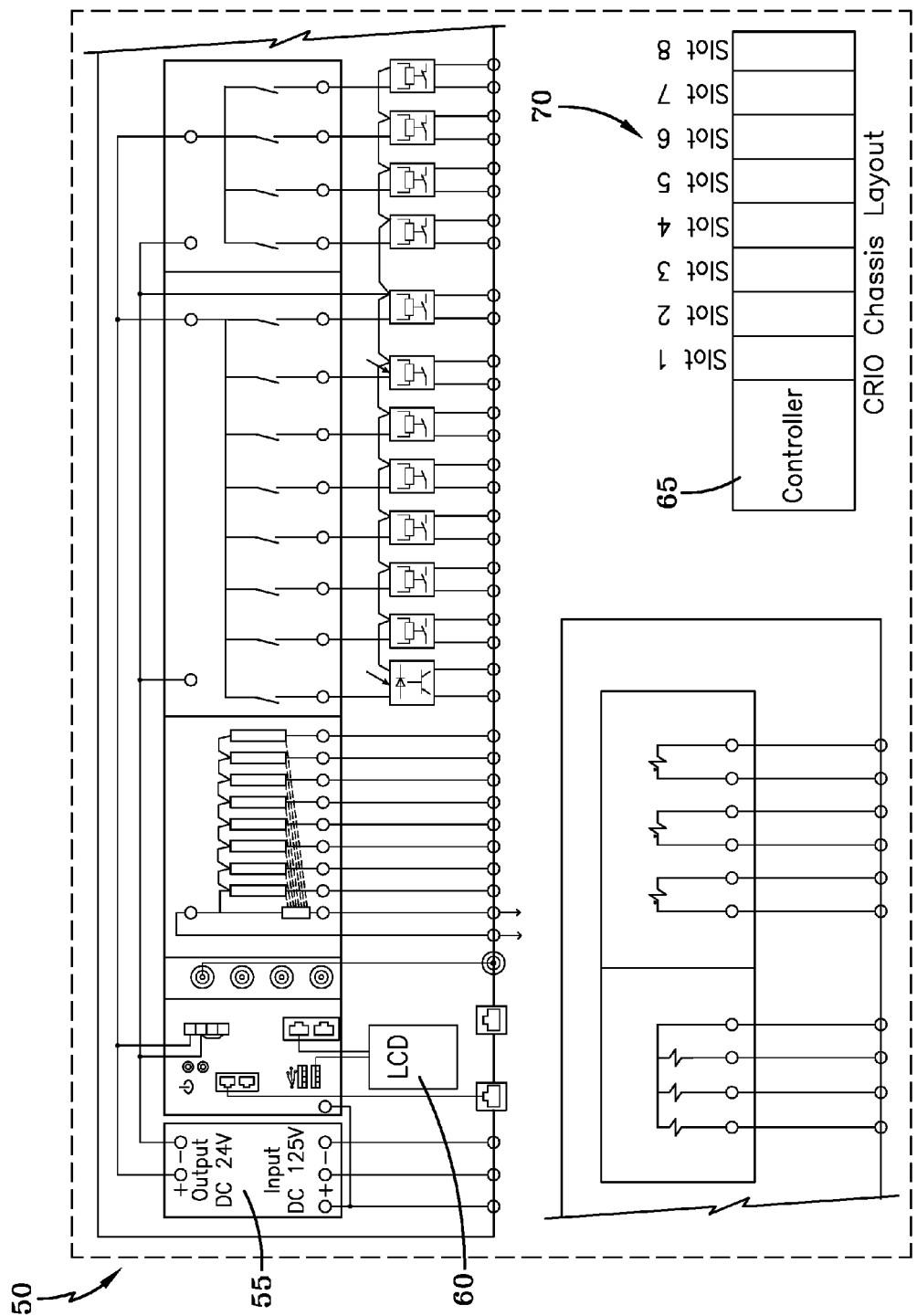
FIG. 14 is an exemplary hardware diagram for one exemplary embodiment of a subsynchronous oscillation relay.

As previously mentioned, exemplary SSO relay embodiments described herein may be embodied within a generic hardware platform that facilitates a simplified and efficient bottom-up software design. One such exemplary hardware platform 50 is schematically depicted in FIG. 14. It can be seen that this exemplary hardware platform provides for a highly configurable and customizable SSO relay, and includes, among other things, a power supply 55, a touchscreen display 60, an embedded controller with a real-time processor 65 and a reconfigurable and field-programmable gate array, and a plurality of input module and output module slots 70 that facilitate the use of various input and output modules selected for particular functionality.

All of the electronic components of a SSO relay constructed using such a hardware platform may be located within a rugged and shock-absorbent housing (case), such as the case shown in FIG. 6. The case may be designed to allow the SSO relay to be rack mountable. A non-limiting example of a usable generic hardware platform is available from National Instruments in Austin, Tex.

Notably, the particular exemplary SSO relay embodiment design shown in FIG. 14 supports the use of modular inputs. While such a design feature is not essential, it may be advantageous. Power system instrument transformers convert system voltage and current into levels that are measurable by an intelligent electronic device (IED), such as a relay or meter. Conventional current transformers (CTs) convert power system currents to 1 amp or 5 amp normal outputs. Conventional voltage transformers convert high voltage (e.g., kilo-volts) into sub-hundred volts. New optical measurement technologies convert system current and voltage into different voltage levels depending on the application.

By employing a modular SSO relay design such as that depicted in FIG. 14, input modules may be selected to match the output characteristics of a given measurement technology. For example, when a SSO relay is deployed at a series capacitor bank of a series-compensated transmission line, a 5 volt input module may be selected and installed to the SSO relay to match the optical technology that is often applied to such a capacitor bank for converting line currents to a voltage signal within 5 volts. Similarly, when a SSO relay is installed at a substation to interface with conventional CTs, a 1 amp or 5 amp CT input module may be used in the SSO relay. In general, an exemplary modular SSO relay can accommodate different power system measurement techniques simply through proper selection of a corresponding input module(s)—thus eliminating any need to alter the associated protection algorithm and/or other logic.

Figure 15A:
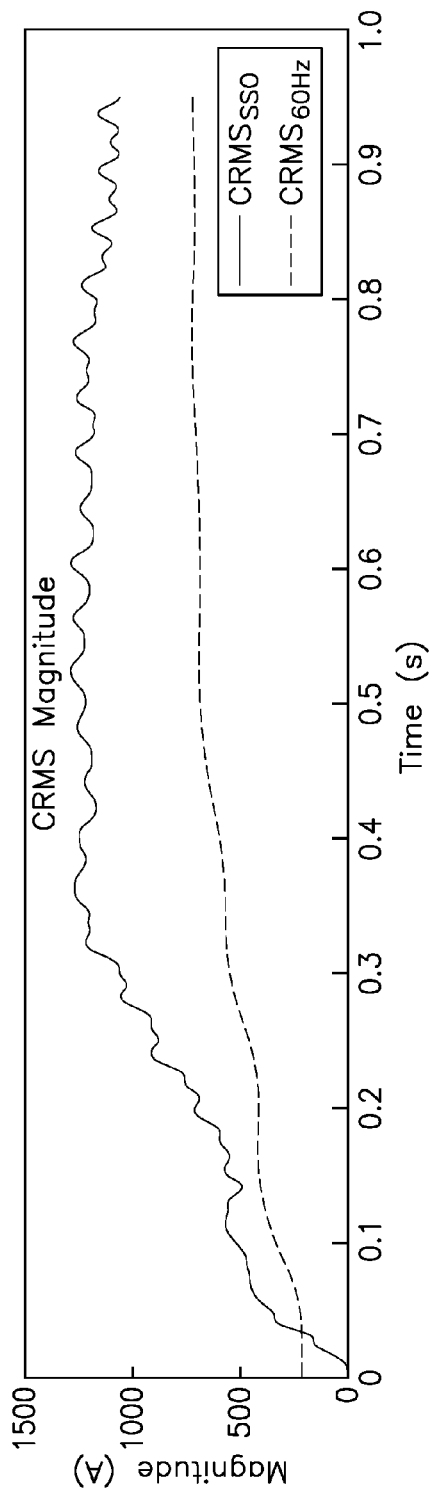
FIGS. 15A-15B graphically represent performance validation through simulation of an exemplary subsynchronous oscillation relay embodiment.
Figure 15B:
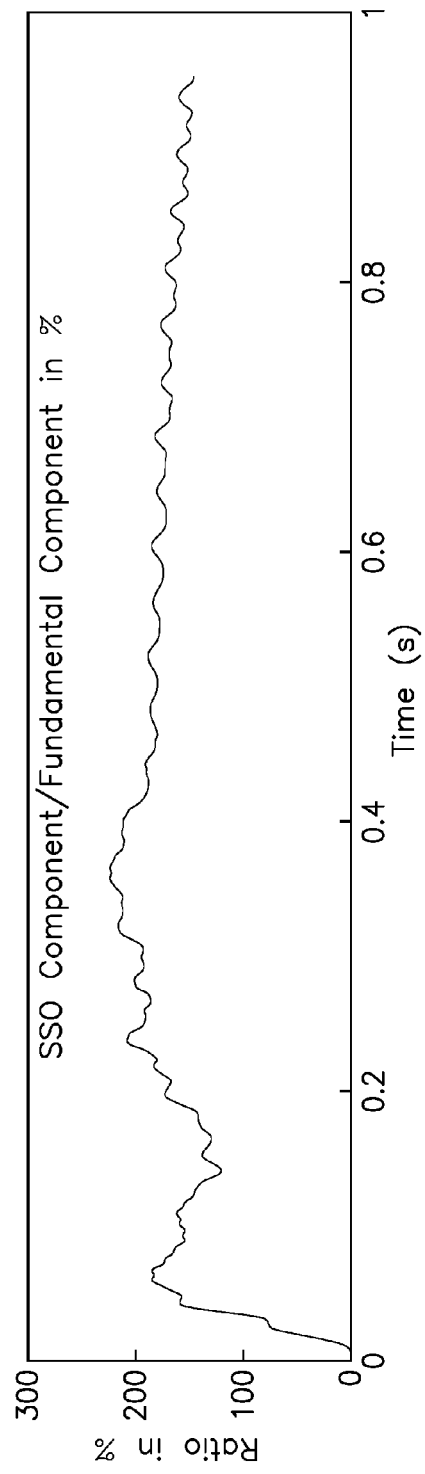

The ability of an exemplary SSO relay to quickly detect and properly react to a SSCI oscillation event has been verified through extensive simulation testing. In accordance with this testing method, SSCI oscillation events were simulated and associated signals were provided to a connected exemplary SSO relay embodiment. In one example, the recorded current signals of FIG. 10A were used to verify the performance of the presented SSO protection logic in this manner. The graph of FIG. 15A shows the CRMS value of the SSO component and the 60 Hz component of the aforementioned current signals as calculated by the protection logic of the exemplary SSO relay. As shown, the SSO component value increased much faster than the 60 Hz component after the simulated system entered into the oscillation mode. The graph of FIG. 15B shows the ratio of the SSO component and fundamental frequency component RMS values as a percentage, with the minimum pickup threshold value set to 100%. As can be observed, the simulation shows that the exemplary SSO relay would have detected the SSO condition within 50 milliseconds of its initiation.

Figure 16:
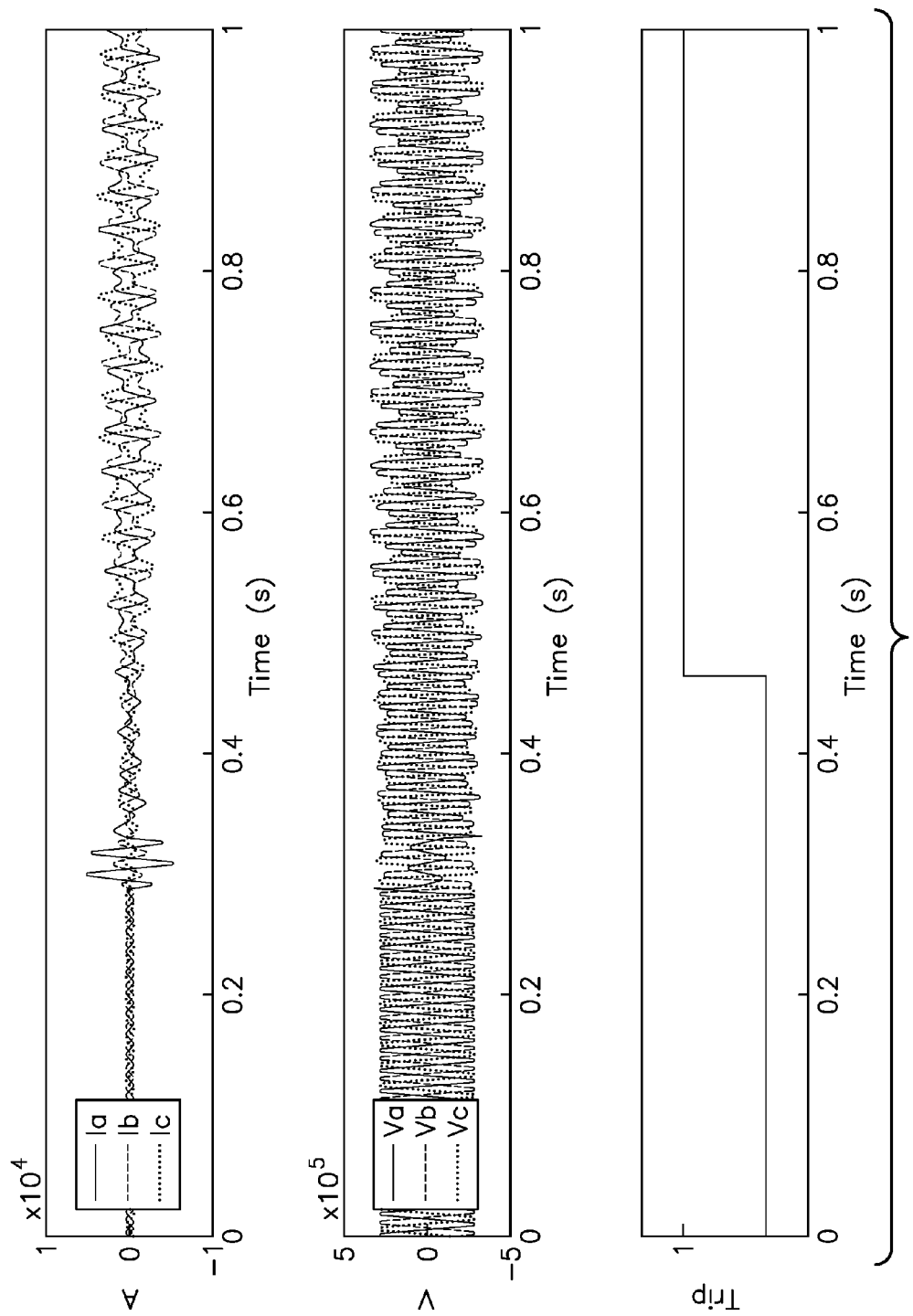
FIG. 16 graphically represents the performance validation of an exemplary subsynchronous oscillation relay using a real time digital simulator, wherein it is shown that the exemplary relay timely detected and reacted to a simulated subsynchronous oscillation event.

The ability of an exemplary SSO relay to quickly detect and properly react to a SSCI oscillation event has also been verified through extensive testing using a real time digital simulator (RTDS). In accordance with this testing method, the performance of an exemplary SSO relay embodiment was observed in a hardware-in-the-loop (HITL) test environment by using a RTDS. The results of one such RTDS test are graphically presented in FIG. 16. In the test case represented by FIG. 16, the SSO minimum pickup threshold setting value of the tested exemplary SSO relay was set to 30% and the time delay before response was set to 100 milliseconds to increase security. As FIG. 16 shows, using these settings, the exemplary SSO relay detected the initiation of a SSO within 10 milliseconds and correctly responded to the SSO event after the intentional delay of 100 milliseconds. Intensive HITL testing in the lab proves the performance of the SSO relay design provides a satisfactory mechanism for detecting and reacting to SSCI oscillation events.

From the foregoing description, it may be understood by one of skill in the art that exemplary SSO relay embodiments described and shown herein are usable to detect and react to subsynchronous oscillation events caused by the control interaction between wind turbines and associated series-compensated transmission networks (i.e., SSCI events) in a manner that will prevent damage to system equipment. Furthermore, while it is particularly described herein for purposes of illustration that an exemplary SSO relay may be used in association with a renewable electrical energy generation system, it should also be realized that it may also be desirable in some circumstances to use an exemplary SSO relay to monitor the shaft of a traditional steam turbine generator or a combustion gas turbine.

While certain exemplary SSO relay embodiments and methods of use are described in detail above, the scope of the inventive concept is not considered limited by such disclosure, and modifications thereto are possible.

What is claimed is:

1. A subsynchronous oscillation relay, comprising:
   protection logic circuitry provided with filtering functionality through which a subsynchronous oscillation component is extractable from a fundamental frequency component of a monitored signal from an electrical energy generation system; and
   programming, including a protection algorithm that uses quantities of both the subsynchronous oscillation component and the fundamental frequency component of the monitored signal as an operational quantity, and an output signal that is usable, upon detection of a subsynchronous oscillation event, to initiate a protection protocol.

2. The relay of claim 1, wherein the filtering functionality is provided by a bandpass filter that is operable within a predetermined frequency range.

3. The relay of claim 2, wherein the predetermined frequency range is selected from the group consisting of about 5 Hz to about 55 Hz and 5 Hz to about 45 Hz.

4. The relay of claim 1, wherein the protection logic circuitry is adapted to monitor each of the three phases of the electrical energy generation system signal.

5. The relay of claim 4, wherein the protection logic circuitry includes an individual protection logic circuit for both current and voltage aspects of each phase of the electrical energy generation system signal.

6. The relay of claim 1, wherein the protection algorithm utilizes the ratio of the magnitude of the subsynchronous oscillation component to the magnitude of the fundamental frequency component as an operational quantity.

7. The relay of claim 6, wherein the protection algorithm is further adapted to use a continuous root mean square method to calculate the magnitudes of the subsynchronous oscillation component and the fundamental frequency component.

8. The relay of claim 1, wherein the protection algorithm utilizes a fundamental frequency component minimum pickup threshold value.

9. The relay of claim 1, wherein the protection algorithm utilizes a subsynchronous oscillation minimum pickup threshold value.

10. The relay of claim 9, wherein the subsynchronous oscillation minimum pickup threshold value is about 50% for current-based protection and about 20% for voltage-based protection.

11. The relay of claim 9, wherein the programming is adapted to allow for adjustment of the time required to detect a subsynchronous oscillation event by selecting different combinations of subsynchronous oscillation minimum pickup threshold values and continuous root mean square calculation time windows.

12. The relay of claim 1, wherein the programming includes a selectable time delay before which the relay will react to a detected subsynchronous oscillation event.

13. The relay of claim 12, wherein the selectable time delay is set to 0.1 seconds and the subsynchronous oscillation minimum pickup threshold value is set to 50%.

14. The relay of claim 1, wherein the protection protocol is selected from the group consisting of bypassing a capacitor bank of a series-compensated transmission line to which the relay is connected, disconnecting an associated wind turbine from an associated transmission grid, and a combination thereof.

15. A method of detecting and reacting to a subsynchronous oscillation event in an electrical energy generation system, comprising:
   providing a subsynchronous oscillation relay, the subsynchronous oscillation relay comprising:
      protection logic circuitry provided with filtering functionality through which a subsynchronous oscillation component is extractable from a fundamental frequency component of a monitored signal from an electrical energy generation system, and
      programming, including a protection algorithm that uses quantities of both the subsynchronous oscillation component and the fundamental frequency component of the monitored signal as an operational quantity;
   using the subsynchronous oscillation relay to monitor each phase of the monitored signal from the electrical energy generation system;
   causing the protection algorithm of the subsynchronous oscillation relay to calculate the ratio of the magnitude of the subsynchronous oscillation component to the magnitude of the fundamental frequency component;
comparing the calculated ratio to a provided threshold setting; and
when the calculated ratio exceeds the threshold setting, determining that a subsynchronous oscillation event is occurring, and causing the subsynchronous oscillation relay to output a signal that initiates a protection protocol.

16. The method of claim 15, wherein the filtering functionality is operable to extract a subsynchronous oscillation component of the monitored signal within a frequency range selected from the group consisting of about 5 Hz to about 55 Hz and about 5 Hz to about 45 Hz.

17. The method of claim 15, wherein the protection logic circuitry monitors both current and voltage aspects of each phase of the monitored signal.

18. The method of claim 15, further comprising using a continuous root mean square method to calculate the magnitude of the subsynchronous oscillation component and the magnitude of the fundamental frequency component.

19. The method of claim 15, further comprising providing the protection algorithm with a fundamental frequency component minimum pickup threshold value and a subsynchronous oscillation minimum pickup threshold value.

20. The method of claim 19, wherein the subsynchronous oscillation minimum pickup threshold value is set to about 50% for current-based protection and to about 20% for voltage-based protection.

21. The method of claim 19, further comprising adjusting the time required to detect a subsynchronous oscillation event by selecting different combinations of subsynchronous oscillation minimum pickup threshold values and continuous root mean square calculation time windows.

22. The method of claim 15, further comprising setting on the subsynchronous oscillation relay a selectable time delay before which the relay will react to a detected subsynchronous oscillation event.

23. The method of claim 22, wherein the selectable time delay is set to 0.1 seconds and the subsynchronous oscillation minimum pickup threshold value is set to 50% for current and 20% for voltage.

24. The method of claim 15, wherein the protection protocol is selected from the group consisting of bypassing a capacitor bank of a series-compensated transmission line to which the relay is connected, disconnecting an associated wind turbine from an associated transmission grid, and a combination thereof.

25. A subsynchronous oscillation relay for detecting and reacting to subsynchronous control interaction (SSCI) events, comprising:
a housing for substantially enclosing various electronic components of the relay;
a power supply;
a controller with a microprocessor;
protection logic circuitry for each phase of a monitored signal from an electrical energy generation system, the protection logic circuitry including a bandpass filter that is operable within a predetermined frequency range to extract a subsynchronous oscillation component from a fundamental frequency component of the monitored signal; and
programming, including a protection algorithm that:
uses quantities of both the subsynchronous oscillation component and the fundamental frequency component of the monitored signal as an operational quantity,
includes a fundamental frequency component minimum pickup threshold value,
includes a subsynchronous oscillation minimum pickup threshold value, and
includes a selectable time delay before which the relay will react to a detected SSCI event;
wherein, upon detection of a SSCI event, the controller is adapted to initiate a protection protocol selected from the group consisting of bypassing a capacitor bank of a series-compensated transmission line to which the relay is connected, disconnecting an associated wind turbine from an associated transmission grid, and a combination thereof.

26. The relay of claim 25, wherein the predetermined frequency range is about 5 Hz to about 55 Hz for an electrical energy generation system having a fundamental frequency of about 60 Hz, and about 5 Hz to about 45 Hz for an electrical energy generation system having a fundamental frequency of about 50 Hz.

27. The relay of claim 25, wherein the protection logic circuitry includes an individual protection logic circuit for both current and voltage aspects of each phase of the electrical energy generation system signal.

28. The relay of claim 25, wherein the protection algorithm is adapted to:
use a continuous root mean square method to calculate the magnitudes of each of the subsynchronous component and the fundamental frequency component; and
calculate the ratio of the magnitude of the subsynchronous oscillation component to the magnitude of the fundamental frequency component as an operational quantity.

29. The relay of claim 25, wherein the subsynchronous oscillation minimum pickup threshold value is about 50% for current-based protection and about 20% for voltage-based protection.

30. The relay of claim 25, wherein the programming is adapted to allow for adjustment of the time required to detect a subsynchronous oscillation event by selecting different combinations of subsynchronous oscillation minimum pickup threshold values and continuous root mean square calculation time windows.

31. The relay of claim 30, wherein the selectable time delay is set to 0.1 seconds and the subsynchronous oscillation minimum pickup threshold value is set to 50% for current and 20% for voltage.

* * * * *